United States Patent
Peng et al.

(10) Patent No.: US 9,826,567 B2
(45) Date of Patent: Nov. 21, 2017

(54) D2D SWITCHOVER METHOD, SYSTEM, AND DEVICE

(71) Applicant: China Academy of Telecommunications Technology, Beijing (CN)

(72) Inventors: Ying Peng, Beijing (CN); Qiubin Gao, Beijing (CN); Wenhong Chen, Beijing (CN); Rui Zhao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 21 days.

(21) Appl. No.: 14/773,383

(22) PCT Filed: Mar. 17, 2014

(86) PCT No.: PCT/CN2014/073504
§ 371 (c)(1),
(2) Date: Sep. 7, 2015

(87) PCT Pub. No.: WO2014/146556
PCT Pub. Date: Sep. 25, 2014

(65) Prior Publication Data
US 2016/0029429 A1 Jan. 28, 2016

(30) Foreign Application Priority Data
Mar. 18, 2013 (CN) .......................... 2013 1 0085647

(51) Int. Cl.
*H04W 72/04* (2009.01)
*H04W 76/04* (2009.01)
(Continued)

(52) U.S. Cl.
CPC ......... *H04W 76/043* (2013.01); *H04W 24/02* (2013.01); *H04W 24/10* (2013.01);
(Continued)

(58) Field of Classification Search
CPC ... H04W 36/00; H04W 76/043; H04W 24/02; H04W 88/06; H04W 36/26; H04W 84/12; H04W 24/10
See application file for complete search history.

(56) References Cited

U.S. PATENT DOCUMENTS

| | | | |
|---|---|---|---|
| 2006/0148502 A1* | 7/2006 | Korneluk | H04W 76/043 455/518 |
| 2011/0103240 A1* | 5/2011 | Taghavi Nasrabadi | H04W 72/085 370/252 |

(Continued)

FOREIGN PATENT DOCUMENTS

| CN | 101091402 A | 12/2007 |
|---|---|---|
| CN | 102598844 A | 7/2012 |

(Continued)

OTHER PUBLICATIONS

International Search Report for PCT /CN2014/073504.
(Continued)

*Primary Examiner* — Lakeram Jangbahadur
(74) *Attorney, Agent, or Firm* — Kilpatrick Townsend & Stockton LLP

(57) ABSTRACT

Embodiments of the present application relate to the technical field of wireless communication, in particular a D2D switchover method, system, and device, for solving the problem in prior art of the lack of mechanism for D2D switchover for D2D user devices under appropriate conditions so as to ensure the short-distance transmission quality in the situation where an LTE system has too high a load and interference is too strong. Embodiments of the present invention comprise: a network device determines, according to resource management information and/or channel status information whether a D2D user device needs to perform a D2D switchover; when the D2D user device is determined
(Continued)

to need to perform a D2D switchover, the D2D user device is triggered to switch to a heterogeneous system and conduct end-to-end communication, or to conduct end-to-end communication via the network device, or to conduct in the current system end-to-end communication not controlled by the network device. The method in the embodiments of the present invention ensures that D2D devices can perform D2D switchover under appropriate conditions even when an LED system has too high a load and interference is too strong, thereby enhancing the end-to-end communication performance.

16 Claims, 6 Drawing Sheets

(51) Int. Cl.
  *H04W 36/00*   (2009.01)
  *H04W 24/02*   (2009.01)
  *H04W 24/10*   (2009.01)
  *H04W 36/26*   (2009.01)
  *H04W 84/12*   (2009.01)
  *H04W 88/06*   (2009.01)

(52) U.S. Cl.
  CPC ........... *H04W 36/00* (2013.01); *H04W 36/26* (2013.01); *H04W 84/12* (2013.01); *H04W 88/06* (2013.01)

(56) References Cited

U.S. PATENT DOCUMENTS

| 2011/0228666 | A1* | 9/2011 | Barbieri | H04W 76/023 370/216 |
| 2011/0258327 | A1* | 10/2011 | Phan | H04W 16/10 709/227 |
| 2012/0044815 | A1* | 2/2012 | Geirhofer | H04W 72/082 370/248 |
| 2014/0057670 | A1* | 2/2014 | Lim | H04W 8/005 455/509 |
| 2014/0219095 | A1* | 8/2014 | Lim | H04W 72/085 370/235 |

FOREIGN PATENT DOCUMENTS

| CN | 102783211 A | 11/2012 |
| WO | 2011131666 A1 | 10/2011 |
| WO | 2011158141 A1 | 12/2011 |
| WO | 2012/150815 A2 | 11/2012 |
| WO | 2013/028044 A2 | 2/2013 |

OTHER PUBLICATIONS

European Search Report for EP 14767304 dated May 10, 2016, 19 pages.
The Partial Supplementary European Search Report dated Feb. 19, 2016 in the EP counterpart application (14767304.0).

* cited by examiner a) Interference to downlink data of UE2 in cellular network from D2D data b) Interference to D2D data received by UE1 from cellular-network data transmitted by UE2

D2D SWITCHOVER METHOD, SYSTEM, AND DEVICE

This application is a US National Stage of International Application No. PCT/CN2014/073504, filed on Mar. 17 2014, designating the United States, and claiming the benefit of Chinese Patent Application No. 201310085647.4, filed with the State Intellectual Property Office of People's Republic of China on Mar. 18, 2013 and entitled "D2D switching method, system and device", which is hereby incorporated by reference in its entirety.

FIELD

The present invention relates to the field of wireless communications and particularly to a D2D switching method, system and device.

BACKGROUND

FIG. 1 illustrates a data communication flow between two User Equipments (UEs) in traditional cellular communication technologies, where voice, data and other service of the two user equipments are exchanged through respective evolved Node B's (eNBs) where they are camping on, and a core network.

The technology of Device-to-Device (D2D), i.e., direct communication between user equipments, refers to a scheme in which the adjacent user equipments can transmit data in a short-distance range over a direct connection link without forwarding through any central node (i.e., an eNB), as illustrated in FIG. 2. The D2D technology has the following advantages due to its short-distance communication characteristic and direct communication scheme:

The user equipments can communicate directly over a short distance at a relatively high data rate, a relatively low delay, and relatively low power consumption;

Spectrum resources can be utilized efficiently using the user equipments widely distributed in the network, and the short-distance characteristic of the D2D communication link;

The D2D direct communication scheme can be adapted, for example, for a demand of sharing local data for wireless P2P and other services, to provide data services with a flexible adaptation capacity; and D2D direct communication can extend a coverage area of the network using a large number of communication user equipments widely distributed in the network.

For the problem of inter-interference with the cellular network when there is network coverage: an influence upon the user equipments in the traditional cellular network when there is network coverage will be alleviated as much as possible, as illustrated in FIG. 3.

In the LTE system, although the base station can operate as a central controller in the LTE to schedule reasonably communication between the D2D user equipments, if there is a high load in the LTE system, thus resulting in significant interference, then there will be no mechanism to guarantee that a D2D user equipment in the LTE system is D2D-switched under reasonable conditions to another distinct system with the guaranteed quality of transmission over a short distance.

In summary, if there is a high load in the LTE system, thus resulting in significant interference, then there has been absent so far a mechanism to enable a D2D user equipment to perform D2D-switching under reasonable conditions to guarantee the quality of transmission over a short distance.

SUMMARY

The invention provides a D2D switching method, system and device so as to address such a problem in the prior art that if there is a high load in an LTE system, thus resulting in significant interference, then there has been absent so far a mechanism to enable a D2D user equipment to perform D2D-switching under reasonable conditions to guarantee the quality of transmission over a short distance.

An embodiment of the invention provides a Device-to-device (D2D) switching method including:

determining, by a network-side device from resource management information and/or channel state information, whether a D2D user equipment needs to be D2D-switched; and triggering, by the network-side device, the D2D user equipment to be switched to a distinct system for device-to-device communication, or to perform device-to-device communication through the network-side device, or to perform device-to-device communication in the present system without being controlled by the network-side device, upon determining that the D2D user equipment needs to be D2D-switched.

Optionally triggering the D2D user equipment to be switched to the distinct system for device-to-device communication includes:

triggering the D2D user equipment to be switched to the distinct system for device-to-device communication while being controlled differently by the network-side device or without being controlled by the network-side device; and triggering the D2D user equipment to perform device-to-device communication through the network-side device includes:

triggering the D2D user equipment to perform device-to-device communication in the present system while being controlled differently by the network-side device.

Optionally determining, by the network-side device from the resource management information, whether the D2D user equipment needs to be D2D-switched includes:

determining, by the network-side device, the D2D user equipment needs to be D2D-switched, upon determining that a D2D switching condition is satisfied, or determining, by the network-side device, whether the D2D user equipment needs to be D2D-switched according to a priority of service of the D2D user equipment, and/or a type of service resource for D2D communication;

wherein the D2D switching condition includes a part or all of the following conditions:

an interference value or an interference average value to which a user equipment in non-device-to-device communication is really subjected when other user equipments are in device-to-device communication is more than a first threshold;

an interference value or an interference average value to which a user equipment in non-device-to-device communication is expected to be subjected when other user equipments are in device-to-device communication is more than a second threshold;

an interference value or an interference average value to which the D2D user equipment is really subjected in device-to-device communication is more than a third threshold;

an interference value or an interference average value to which the D2D user equipment is expected to be subjected in device-to-device communication is more than a fourth threshold;

the ratio of a network resource to be occupied by the D2D user equipment needing device-to-device communication to total network resources is more than a fifth threshold;

the ratio of a network resource occupied by the D2D user equipment in device-to-device communication to total network resources is more than a sixth threshold;

power of a signal, received by the D2D user equipment, transmitted by the network side is lower than an eighth threshold and/or higher than a ninth threshold; and switching of the D2D user equipment is allowed to be admitted in the distinct system.

Optionally if the D2D user equipment is a user equipment needing device-to-device communication, then the interference value to the D2D user equipment is total power received over a resource for D2D communication in a network configured or predefined time window, and the interference average value is a power average value over a unit of resource for D2D communication in the network configured or predefined time window; and if the D2D user equipment is a user equipment in device-to-device communication, then the interference value to the D2D user equipment is a signal to interference and noise ratio in device-to-device communication of the D2D user equipment, and the interference average value is a quantified parameter related to a signal to interference and noise ratio in device-to-device communication of the D2D user equipment.

Optionally determining, by the network-side device from the channel state information, whether the D2D user equipment needs to be D2D-switched includes:

determining, by the network-side device from a measured parameter value, measured by the user equipment, of a device-to-device communication channel/signal in the distinct system an operating frequency band of device-to-device communication of the user equipment D2D-switched to the distinct system, or receiving the operating frequency band of device-to-device communication of the user equipment D2D-switched to the distinct system, reported by the user equipment; and determining, by the network-side device, that the D2D user equipment needs to be D2D-switched, if a channel quality value in the determined operating frequency band is more than a seventh threshold or the sum of the seventh threshold and a floating threshold.

Optionally before determining, by the network-side device from the channel state information, whether the D2D user equipment needs to be D2D-switched, the method further includes:

configuring, by the network-side device, the user equipment to measure the device-to-device communication channel/signal in the distinct system.

Optionally determining, by the network-side device from the measured parameter value, measured by the user equipment, of the device-to-device communication channel/signal in the distinct system the operating frequency band of the user equipment D2D-switched to the distinct system includes:

converting, by the network-side device, the measured parameter value, measured by the user equipment, of the device-to-device communication channel/signal in the distinct system into a parameter value representing the resource management information in a Long Term Evolution (LTE) network, and determining the operating frequency band of the user equipment D2D-switched to the distinct system from the converted parameter value.

Optionally device-to-device communication is performed over a Wireless Local Area Network (WLAN), and the measured parameter value includes a part or all of the following measured parameter values:

a basic measured parameter value;

an idle channel evaluated value;

a Received Power Indicator (RPI) histogram;

a received power indicator of the user equipment;

a received power value, or a received level corresponding to the received power value, in a WLAN available frequency band; and a measured parameter value in a list of available frequency bands.

Optionally triggering, by the network-side device, the D2D user equipment to be switched to the distinct system for device-to-device communication, or to perform device-to-device communication through the network-side device, or to perform device-to-device communication in the present system without being controlled by the network-side device, upon determining that the D2D user equipment needs to be D2D-switched includes:

determining, by the network-side device, that at least one of D2D user equipments in a group of D2D user equipments needs to be D2D-switched, and triggering all the D2D user equipments in the group of D2D user equipments to be switched to the distinct system for device-to-device communication, or to perform device-to-device communication through the network-side device, or to perform device-to-device communication in the present system without being controlled by the network-side device.

Optionally the D2D user equipments are grouped by their geographical positions and/or communication services.

Optionally after triggering, by the network-side device, the D2D user equipment to be D2D-switched, upon determining that the D2D user equipment needs to be D2D-switched, the method further includes:

sending, by the network-side device, the same synchronization signal, or broadcasting the synchronization signal, to each of the D2D user equipments in the group of D2D user equipments.

Optionally after triggering, by the network-side device, the D2D user equipment to be switched to the distinct system for device-to-device communication, the method further includes:

sending, by the network-side device, switching information to the user equipment;

wherein the switching information includes a part or all of the following information:

a synchronization signal for synchronization;

transmitting power information configured to control transmitting power of the D2D user equipment in communication;

information about a discovery signal of paired user equipment in the distinct system for discovering; and information about a discovery signal user equipment in the distinct system for being discovered.

An embodiment of the invention provides another D2D switching method including:

determining, by the user equipment, that a network-side device triggers the D2D user equipment to be D2D-switched, wherein the D2D user equipment is triggered by the network-side device to be D2D-switched, upon determining from resource management information and/or channel state information that the D2D user equipment needs to be D2D-switched; and switching the user equipment to a distinct system for device-to-device communication, or performing, by the user equipment, device-to-device communication through the network-side device, or performing device-to-device communication in the present system without being controlled by the device-to-device communication.

Optionally switching the user equipment to the distinct system for device-to-device communication includes:

switching to the distinct system for device-to-device communication while being controlled differently by the network-side device or without being controlled by the network-side device; and device-to-device communication of the user equipment through the network-side device includes:

device-to-device communication of the user equipment in the present system while being controlled differently by the network-side device.

Before determining, by the user equipment, that the network-side device triggers the D2D user equipment to be D2D-switched, the method further includes:

measuring, by the user equipment, as configured by the network or as predefined;

observing or averaging, by the user equipment, a measured quantity in a network configured time window or in a predefined time window; and comparing, by the user equipment, the measured quantity or the averaged measured quantity with a network-configured or predefined threshold, and reporting the measured quantity if a condition is satisfied.

Optionally the condition includes any one of the following conditions:

an interference value or an interference average value to which the user equipment in non-device-to-device communication is really subjected when other user equipments are in device-to-device communication is more than a first threshold;

an interference value or an interference average value to which the user equipment in non-device-to-device communication is expected to be subjected when other user equipments are in device-to-device communication is more than a second threshold;

an interference value or an interference average value to which the user equipment is really subjected in device-to-device communication is more than a third threshold;

an interference value or an interference average value to which the user equipment is expected to be subjected in device-to-device communication is more than a fourth threshold; and power of a signal, received by the user equipment, transmitted by the network side is lower than an eighth threshold and/or higher than a ninth threshold.

Optionally before determining, by the user equipment, that the network-side device triggers the D2D user equipment to be D2D-switched, the method further includes:

reporting the interference value to the user equipment, to the network-side device.

Optionally if the user equipment is a user equipment needing device-to-device communication, then the interference value to the user equipment is total power received over a resource for D2D communication in a network configured or predefined time window; and if the user equipment is a user equipment in device-to-device communication, then the interference value to the user equipment is a signal to interference and noise ratio in device-to-device communication of the user equipment.

Optionally before determining, by the user equipment, that the network-side device triggers the D2D user equipment to be D2D-switched, the method further includes:

measuring, by the user equipment, a device-to-device communication channel/signal in the distinct system according to a measurement configuration by the network-side device, obtaining a measured parameter value, and reporting the measured parameter value to the network-side device; or measuring, by the user equipment, the device-to-device communication channel/signal in the distinct system according to the measurement configuration by the network-side device, obtaining the measured parameter values, quantifying the measured parameter value, and reporting the quantified measured parameter value to the network-side device; or measuring, by the user equipment, the device-to-device communication channel/signal in the distinct system according to the measurement configuration by the network-side device, obtaining the measured parameter value, converting the measured parameter value into a parameter value representing the resource management information in an LTE network, and reporting the converted parameter value to the network-side device; or measuring, by the user equipment, the device-to-device communication channel/signal in the distinct system according to the measurement configuration by the network-side device, obtaining the measured parameter value, determining from the measured parameter value an operating frequency band of the user equipment D2D-switched to the distinct system, and reporting the operating frequency band of the user equipment D2D-switched to the distinct system, to the network-side device.

Optionally device-to-device communication is performed over a WLAN, and the measured parameter value includes a part or all of the following measured parameter values:

a basic measured parameter value;

an idle channel evaluated value;

an RPI histogram;

a received power indicator of the user equipment;

a received power value, or a received level corresponding to the received power value, in a WLAN available frequency band; and a measured parameter value in a list of available frequency bands.

Optionally before measuring, by the user equipment, the device-to-device communication channel/signal in the distinct system according to the measurement configuration by the network-side device, the method further includes:

disabling, by the user equipment, communication over the LTE network in a measurement interruption configured by the network-side device if the spacing between a measurement frequency band in which the device-to-device communication channel/signal in the distinct system is measured according to the measurement configuration by the network-side device, and a current operating frequency band in the LTE network is no more than a band threshold.

Optionally before determining, by the user equipment, that the network-side device triggers the D2D user equipment to be D2D-switched, the method further includes:

Switching the user equipment from an idle state to a connected state if the user equipment is in the idle state, and a length of time for which the resource management information of device-to-device communication is less than a signal threshold is more than a preset length of time.

An embodiment of the invention provides a D2D switching method including:

determining, by a D2D user equipment from resource management information and/or channel state information, whether to be D2D-switched; and switching to a distinct system for device-to-device communication, or performing device-to-device communication through the network-side device while being controlled differently by the network-side device or without being controlled by the network-side device, or performing device-to-device communication in the present system while being controlled differently by the network-side device or without being controlled by the network-side device, upon determining that the D2D user equipment needs to be D2D-switched.

Optionally determining, by the D2D user equipment from the resource management information, whether to be D2D-switched includes:

determining that the D2D user equipment needs to be D2D-switched, upon determining that a D2D switching condition is satisfied, or determining whether to be D2D-switched, according to a priority of service of the D2D user equipment, and/or a type of service resource for D2D communication;

wherein the D2D switching condition includes a part or all of the following conditions:

an interference value or an interference average value to which the D2D user equipment, which is a D2D user equipment needing device-to-device communication, is really subjected when other user equipments are in device-to-device communication is more than a first threshold;

an interference value or an interference average value to which the D2D user equipment, which is a D2D user equipment needing device-to-device communication, is expected to be subjected when other user equipments are in device-to-device communication is more than a second threshold;

an interference value or an interference average value to which the D2D user equipment, which is a D2D user equipment in device-to-device communication, is really subjected in device-to-device communication is more than a third threshold;

an interference value or an interference average value to which the D2D user equipment, which is a D2D user equipment needing device-to-device communication, is expected to be subjected in device-to-device communication is more than a fourth threshold;

the ratio of a network resource to be occupied by the D2D user equipment, which is a D2D user equipment needing device-to-device communication, to total network resources is more than a fifth threshold;

the ratio of a network resource occupied by the D2D user equipment, which is a D2D user equipment in device-to-device communication, to total network resources is more than a sixth threshold; and power of a signal, received by the D2D user equipment, transmitted by the network side is lower than an eighth threshold and/or higher than a ninth threshold.

Optionally if the D2D user equipment is a user equipment needing device-to-device communication, then the interference value to the D2D user equipment is total power received over a resource for D2D communication in a network configured or predefined time window, and the interference average value is a power average value over a unit of resource for D2D communication in the network configured or predefined time window; and if the D2D user equipment is a user equipment in device-to-device communication, then the interference value to the D2D user equipment is a signal to interference and noise ratio in device-to-device communication of the D2D user equipment, and the interference average value is a quantified parameter related to a signal to interference and noise ratio in device-to-device communication of the D2D user equipment.

Optionally determining, by the D2D user equipment from the channel state information, whether to be D2D-switched includes:

determining an operating frequency band of device-to-device communication of the user equipment switched to the distinct system, from a measured parameter value measured of a device-to-device communication channel/signal in the distinct system according to a measurement configuration by the network-side device; and determining that the D2D user equipment needs to be D2D-switched, if a channel quality value in the determined operating frequency band is more than a seventh threshold or the sum of the seventh threshold and a floating threshold.

Optionally determining the operating frequency band of the user equipment switched to the distinct system, from the measured parameter value of the device-to-device communication channel/signal in the distinct system includes:

converting the measured parameter value measured of the device-to-device communication channel/signal in the distinct system into a parameter value representing the resource management information in a Long Term Evolution (LTE) network, and determining the operating frequency band in the distinct system from the converted parameter value.

Optionally device-to-device communication is performed over a WLAN, and the measured parameter value includes a part or all of the following measured parameter values:

a basic measured parameter value;

an idle channel evaluated value;

a Received power Indicator (RPI) histogram;

a received power indicator of the user equipment;

a received power value, or a received level corresponding to the received power value, in a WLAN available frequency band; and a measured parameter value in a list of available frequency bands.

Optionally before measuring the device-to-device communication channel/signal in the distinct system according to the measurement configuration by the network-side device, the method further includes:

disabling communication over the LTE network in a measurement interruption configured by the network-side device if the spacing between a measurement frequency band in which the device-to-device communication channel/signal in the distinct system is measured according to the measurement configuration by the network-side device, and a current operating frequency band in the LTE network is no more than a frequency band threshold.

Optionally before determining that the D2D user equipment needs to be D2D-switched, the method further includes:

Switching, by the D2D user equipment, from an idle state to a connected state if the D2D user equipment is in the idle state, and a length of time for which the resource management information of device-to-device communication is less than a signal threshold is more than a preset length of time.

An embodiment of the invention provides a D2D switching device including:

a determining module configured to determine from resource management information and/or channel state information whether a D2D user equipment needs to be D2D-switched; and a triggering module configured to trigger the D2D user equipment to be switched to a distinct system for device-to-device communication, or to perform device-to-device communication through the network-side device, or to perform device-to-device communication in the present system without being controlled by the network-side device, when it is determined that the D2D user equipment needs to be D2D-switched.

Optionally the triggering module configured to trigger the D2D user equipment to be switched to the distinct system for device-to-device communication is configured:

to trigger the D2D user equipment to be switched to the distinct system for device-to-device communication while being controlled differently by the network-side device or without being controlled by the network-side device; and the triggering module configured to trigger the D2D user equipment to perform device-to-device communication through the network-side device is configured:

to trigger the D2D user equipment to perform device-to-device communication in the present system while being controlled differently by the network-side device.

The determining module is configured:

to determine that the D2D user equipment needs to be D2D-switched, upon determining that a D2D switching condition is satisfied; or to determine whether the D2D user equipment needs to be D2D-switched, according to a priority of service of the D2D user equipment, and/or a type of service resource for D2D communication;

wherein the D2D switching condition includes a part or all of the following conditions:

an interference value or an interference average value to which a user equipment in non-device-to-device communication is really subjected when other user equipments are in device-to-device communication is more than a first threshold;

an interference value or an interference average value to which a user equipment in non-device-to-device communication is expected to be subjected when other user equipments are in device-to-device communication is more than a second threshold;

an interference value or an interference average value to which the D2D user equipment is really subjected in device-to-device communication is more than a third threshold;

an interference value or an interference average value to which the D2D user equipment is expected to be subjected in device-to-device communication is more than a fourth threshold;

the ratio of a network resource to be occupied by the D2D user equipment needing device-to-device communication to total network resources is more than a fifth threshold;

the ratio of a network resource occupied by the D2D user equipment in device-to-device communication to total network resources is more than a sixth threshold;

power of a signal, received by the D2D user equipment, transmitted by the network side is lower than an eighth threshold and/or higher than a ninth threshold; and switching of the D2D user equipment is allowed to be admitted in the distinct system.

Optionally if the D2D user equipment is a user equipment needing device-to-device communication, then the interference value to the D2D user equipment is total power received over a resource for D2D communication in a network configured or predefined time window, and the interference average value is a power average value over a unit of resource for D2D communication in the network configured or predefined time window; and if the D2D user equipment is a user equipment in device-to-device communication, then the interference value to the D2D user equipment is a signal to interference and noise ratio in device-to-device communication of the D2D user equipment, and the interference average value is a quantified parameter related to a signal to interference and noise ratio in device-to-device communication of the D2D user equipment.

Optionally the determining module is configured:

to determine from a measured parameter value, measured by the user equipment, of a device-to-device communication channel/signal in the distinct system an operating frequency band of device-to-device communication of the user equipment D2D-switched to the distinct system, or to receive the operating frequency band of device-to-device communication of the user equipment D2D-switched to the distinct system, reported by the user equipment; and to determine that the D2D user equipment needs to be D2D-switched, if a channel quality value in the determined operating frequency band is more than a seventh threshold or the sum of the seventh threshold and a floating threshold.

Optionally the determining module is further configured:

to configure the user equipment to measure the device-to-device communication channel/signal in the distinct system, before determining from the channel state information whether the D2D user equipment needs to be D2D-switched.

Optionally the determining module is configured:

to convert the measured parameter value, measured by the user equipment, of the device-to-device communication channel/signal in the distinct system into a parameter value representing the resource management information in a Long Term Evolution (LTE) network, and to determine the operating frequency band of the user equipment D2D-switched to the distinct system from the converted parameter value.

Optionally device-to-device communication is performed over a WLAN, and the measured parameter value includes a part or all of the following measured parameter values:

a basic measured parameter value;

an idle channel evaluated value;

a Received Power Indicator (RPI) histogram;

a received power indicator of the user equipment;

a received power value, or a received level corresponding to the received power value, in a Wireless Local Area Network (WLAN) available frequency band; and a measured parameter value in a list of available frequency bands.

Optionally the triggering module is configured:

to determine that at least one of D2D user equipments in a group of D2D user equipments needs to be D2D-switched, and to trigger all the D2D user equipments in the group of D2D user equipments to be D2D-switched, or to perform device-to-device communication through the network-side device, or to perform device-to-device communication in the present system while being controlled differently by the network-side device.

Optionally the D2D user equipments are grouped by their geographical positions and/or communication services.

Optionally the triggering module is further configured:

to send the same synchronization signal, or to broadcast the synchronization signal, to each of the D2D user equipments in the group of D2D user equipments.

Optionally the triggering module is further configured:

to send switching information to the D2D user equipment after triggering the user equipment to be switched to the distinct system for device-to-device communication;

wherein the switching information includes a part or all of the following information:

a synchronization signal for synchronization;

transmitting power information configured to control transmitting power of the D2D user equipment in communication;

information about a discovery signal of paired user equipment in the distinct system for discovering; and information about a discovery signal of user equipment in the distinct system for being discovered.

An embodiment of the invention provides a D2D switching user equipment including:

a determining module configured to determine that a network-side device triggers the D2D user equipment to be D2D-switched, wherein the D2D user equipment is triggered by the network-side device to be D2D-switched, upon determining from resource management information and/or channel state information that the D2D user equipment needs to be D2D-switched; and a switching module configured to switch to a distinct system for device-to-device communication, or to perform device-to-device communication through the network-side device, or to perform device-to-device communication in the present system without being controlled by the device-to-device communication.

Optionally the triggering module configured to switch to the distinct system for device-to-device communication is configured:

to switch to the distinct system for device-to-device communication while being controlled differently by the network-side device or without being controlled by the network-side device; and device-to-device communication through the network-side device includes:

device-to-device communication in the present system while being controlled differently by the network-side device.

The determining module is further configured to measure as configured by the network or as predefined, to observe or average a measured quantity in a network configured time window or in a predefined time window, to compare the measured quantity or the averaged measured quantity with a network-configured or predefined threshold, and to report the measured quantity if a condition is satisfied, before determining that the network-side device triggers the D2D user equipment to be D2D-switched Optionally the condition includes any one of the following conditions:

an interference value or an interference average value to which the user equipment in non-device-to-device communication is really subjected when other user equipments are in device-to-device communication is more than a first threshold;

an interference value or an interference average value to which the user equipment in non-device-to-device communication is expected to be subjected when other user equipments are in device-to-device communication is more than a second threshold;

an interference value or an interference average value to which the user equipment is really subjected in device-to-device communication is more than a third threshold;

an interference value or an interference average value to which the user equipment is expected to be subjected in device-to-device communication is more than a fourth threshold; and power of a signal, received by the user equipment, transmitted by the network side is lower than an eighth threshold and/or higher than a ninth threshold.

Optionally the determining module is further configured:

to report the interference value to the user equipment, to the network-side device.

Optionally if the user equipment is a user equipment needing device-to-device communication, then the interference value to the user equipment is total power received over a resource for D2D communication in a network configured or predefined time window; and if the user equipment is a user equipment in device-to-device communication, then the interference value to the user equipment is a signal to interference and noise ratio in device-to-device communication of the user equipment.

Optionally the determining module is further configured:

to measure a device-to-device communication channel/signal in the distinct system according to a measurement configuration by the network-side device, to obtain a measured parameter value, and to report the measured parameter value to the network-side device; or to measure the device-to-device communication channel/signal in the distinct system according to the measurement configuration by the network-side device, to obtain the measured parameter value, to quantify the measured parameter value, and to report the quantified measured parameter value to the network-side device; or to measure the device-to-device communication channel/signal in the distinct system according to the measurement configuration by the network-side device, to obtain the measured parameter value, to convert the measured parameter value into a parameter value representing the resource management information in an LTE network, and to report the converted parameter value to the network-side device; or to measure the device-to-device communication channel/signal in the distinct system according to the measurement configuration by the network-side device, to obtain the measured parameter value, to determine from the measured parameter value an operating frequency band of the user equipment D2D-switched to the distinct system, and to report the operating frequency band of the user equipment D2D-switched to the distinct system, to the network-side device.

Optionally device-to-device communication is performed over a WLAN, and the measured parameter value includes a part or all of the following measured parameter values:

a basic measured parameter value;

an idle channel evaluated value;

an RPI histogram;

a received power indicator of the user equipment;

a received power value, or a received level corresponding to the received power value, in a WLAN available frequency band; and a measured parameter value in a list of available frequency bands.

Optionally the determining module is further configured:

to disable communication over the LTE network in a measurement interruption configured by the network-side device if the spacing between a measurement frequency band in which the device-to-device communication channel/signal in the distinct system is measured according to the measurement configuration by the network-side device, and a current operating frequency band in the LTE network is no more than a band threshold.

Optionally the determining module is further configured:

to switch from an idle state to a connected state if the user equipment is in the idle state, and a length of time for which the resource management information of device-to-device communication is less than a signal threshold is more than a preset length of time.

An embodiment of the invention provides a D2D switching system including:

a network-side device configured to determine from resource management information and/or channel state information whether a D2D user equipment needs to be D2D-switched; and to trigger the D2D user equipment to be switched to a distinct system for device-to-device communication, or to perform device-to-device communication through the network-side device, or to perform device-to-device communication in the present system without being controlled by the network-side device, upon determining that the D2D user equipment needs to be D2D-switched; and the user equipment configured to be switched to the distinct system for device-to-device communication, or to perform device-to-device communication through the network-side device, or to perform device-to-device communication in the present system without being controlled by the network-side device, upon determining that the network-side device triggers the D2D user equipment to be D2D-switched.

An embodiment of the invention further provides a D2D switching user equipment including:

a determining module configured to determine from resource management information and/or channel state information whether the user equipment needs to be D2D-switched; and a switching module configured to switch to a distinct system for device-to-device communication while being controlled differently by a network-side device or without being controlled by the network-side device, or to perform device-to-device communication in the present system while being controlled differently by the network-side device or without being controlled by the network-side device, when it is determined that the user equipment needs to be D2D-switched.

Optionally the determining module configured to determine from the resource management information whether the user equipment needs to be D2D-switched is configured:

to determine that the user equipment needs to be D2D-switched, upon determining that a D2D switching condition is satisfied, or to determine whether the user equipment needs to be D2D-switched, according to a priority of service of the user equipment, and/or a type of service resource for D2D communication;

wherein the D2D switching condition includes a part or all of the following conditions:

an interference value or an interference average value to which the user equipment, which is a user equipment needing device-to-device communication, is really subjected when other user equipments are in device-to-device communication is more than a first threshold;

an interference value or an interference average value to which the user equipment, which is a user equipment needing device-to-device communication, is expected to be subjected when other user equipments are in device-to-device communication is more than a second threshold;

an interference value or an interference average value to which the user equipment, which is a user equipment in device-to-device communication, is really subjected in device-to-device communication is more than a third threshold;

an interference value or an interference average value to which the user equipment, which is a user equipment needing device-to-device communication, is expected to be subjected in device-to-device communication is more than a fourth threshold;

the ratio of a network resource to be occupied by the user equipment, which is a user equipment needing device-to-device communication, to total network resources is more than a fifth threshold;

the ratio of a network resource occupied by the user equipment, which is a user equipment in device-to-device communication, to total network resources is more than a sixth threshold; and power of a signal, received by the user equipment, transmitted by the network side is lower than an eighth threshold and/or higher than a ninth threshold.

Optionally if the user equipment is a user equipment needing device-to-device communication, then the interference value to the user equipment is total power received over a resource for D2D communication in a network configured or predefined time window, and the interference average value is a power average value over a unit of resource for D2D communication in the network configured or predefined time window; and if the user equipment is a user equipment in device-to-device communication, then the interference value to the user equipment is a signal to interference and noise ratio in device-to-device communication of the user equipment, and the interference average value is a quantified parameter related to a signal to interference and noise ratio in device-to-device communication of the user equipment.

Optionally the determining module configured to determine from the channel state information whether the user equipment needs to be D2D-switched is configured:

to determine an operating frequency band of device-to-device communication of the user equipment switched to the distinct system, from a measured parameter value measured of a device-to-device communication channel/signal in the distinct system according to a measurement configuration by the network-side device; and to determine that the user equipment needs to be D2D-switched, if a channel quality value in the determined operating frequency band is more than a seventh threshold or the sum of the seventh threshold and a floating threshold.

Optionally the determining module configured to determine the operating frequency band of device-to-device communication of the user equipment switched to the distinct system, from the measured parameter value, measured by the user equipment, of the device-to-device communication channel/signal in the distinct system is configured to:

to convert the measured parameter value measured of the device-to-device communication channel/signal in the distinct system into a parameter value representing the resource management information in a Long Term Evolution (LTE) network, and to determine the operating frequency band in the distinct system from the converted parameter value.

Optionally device-to-device communication is performed over a WLAN, and the measured parameter value includes a part or all of the following measured parameter values:

a basic measured parameter value;
an idle channel evaluated value;
a Received power Indicator (RPI) histogram;
a received power indicator of the user equipment;
a received power value, or a received level corresponding to the received power value, in a WLAN available frequency band; and
a measured parameter value in a list of available frequency bands.

Optionally before the device-to-device communication channel/signal in the distinct system is measured according to the measurement configuration by the network-side device, the determining module is further configured to disable communication over the LTE network in a measurement interruption configured by the network-side device if the spacing between a measurement frequency band in which the device-to-device communication channel/signal in the distinct system is measured according to the measurement configuration by the network-side device, and a current operating frequency band in the LTE network is no more than a band threshold.

Optionally before it is determined that the D2D user equipment needs to be D2D-switched, the determining module is further configured to switch the D2D user equipment from an idle state to a connected state if the D2D user equipment is in the idle state, and a length of time for which the resource management information of device-to-device communication is less than a signal threshold is more than a preset length of time.

Since the network-side device triggers the D2D user equipment to be switched to the distinct system for device-to-device communication, or to perform device-to-device communication through the network-side device, or to perform device-to-device communication in the present system without being controlled by the network-side device, upon determining from the resource management information and/or the channel state information that the D2D user equipment needs to be D2D-switched, so that even if there is a high load in the LTE system, thus resulting in significant interference, it is guaranteed that the D2D user equipment can be D2D-switched under reasonable conditions, to thereby improve the performance of device-to-device communication.

DETAILED DESCRIPTION OF THE EMBODIMENTS

In embodiments of the invention, a network-side device triggers the Device-to-Device (D2D) user equipment to be switched to a distinct system for device-to-device communication, or to perform device-to-device communication through the network-side device, or to perform device-to-device communication in the present system without being controlled by the network-side device, upon determining from resource management information and/or channel state information (quality of service, QoS) that the D2D user equipment needs to be D2D-switched, so that even if there is a high load in the LTE system, thus resulting in significant interference, it is guaranteed that the D2D user equipment can be D2D-switched under reasonable conditions, to thereby improve the performance of device-to-device communication.

Here the D2D user equipment is a user equipment capable of device-to-device direct communication.

Here the D2D user equipment can be switched to the distinct system for device-to-device communication in two scenarios including one scenario where it is switched to the distinct system for device-to-device communication while being controlled differently by the network-side device, and the other scenario where it is switched to the distinct system for device-to-device communication without being controlled by the network-side device. Furthermore the D2D user equipment can be triggered for device-to-device communication through the network-side device, which particularly is device-to-device communication in the present system while being controlled differently by the network-side device.

The solution according to the embodiments of the invention can be applicable to an LTE system or can be applicable to a system including another device-to-device direct communication link.

In the following description, firstly an implementation with cooperation of the network side and the user equipment side will be described, and then implementations at the network side and the user equipment side will be described respectively, but this will not suggest required cooperation of both the sides for an implementation, and in fact, problems encountered respectively at the network side and the user equipment side will also be addressed in the separate implementations at the network side and the user equipment side, although a better technical effect can be achieved in the implementation with cooperation of both the sides.

Figure 1:
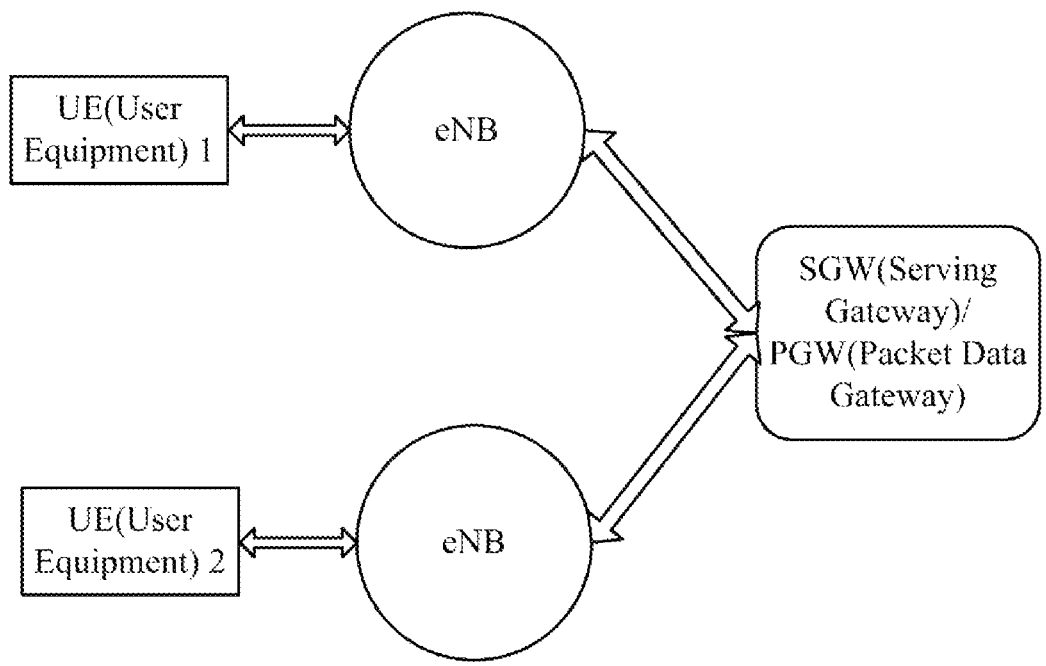
FIG. 1 illustrates a schematic diagram of a data flow in communication between the user equipments in the cellular network in the prior art.
Figure 2:
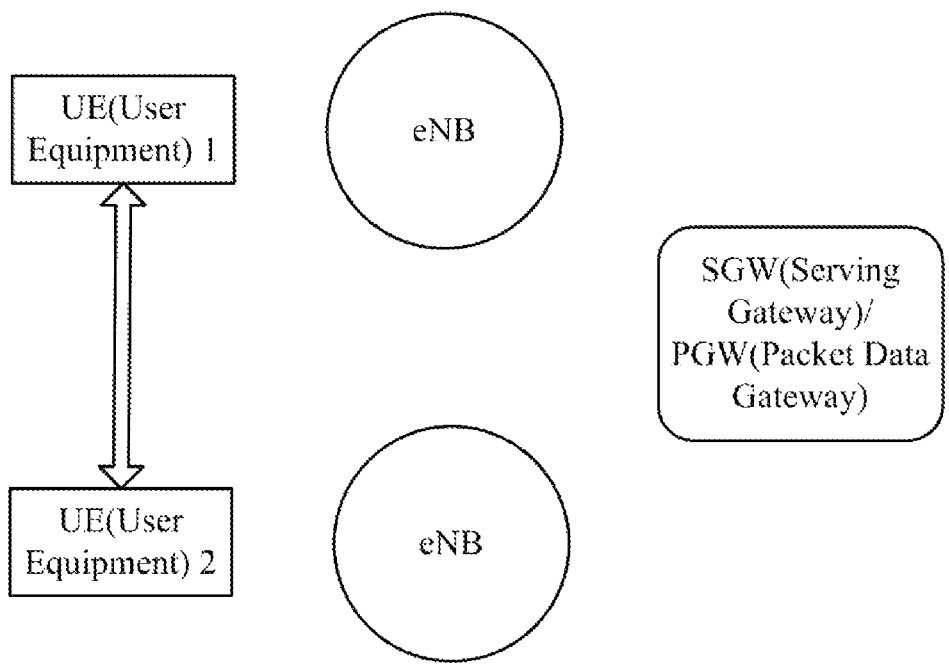
FIG. 2 illustrates a schematic diagram of a data flow in communication between the user equipments in direct communication in the prior art.
Figure 3:
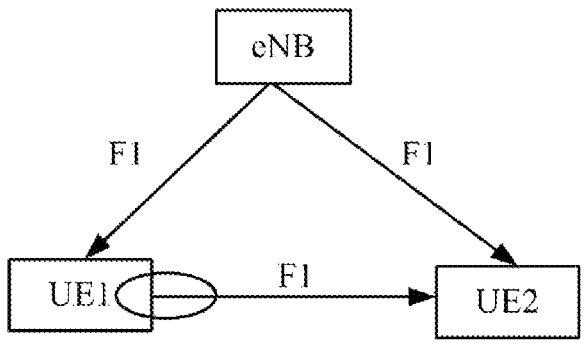
FIG. 3 illustrates a schematic diagram of mutual interference between data in the cellular network and D2D data in the prior art.
Figure 3:
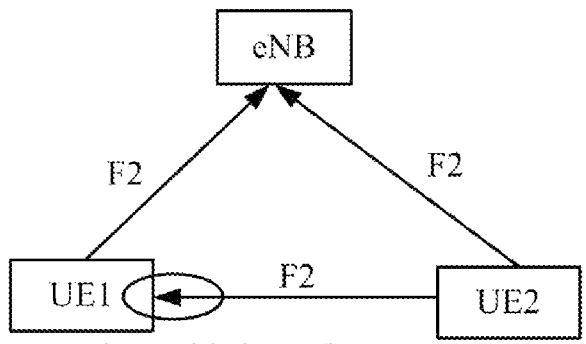
Figure 4A:
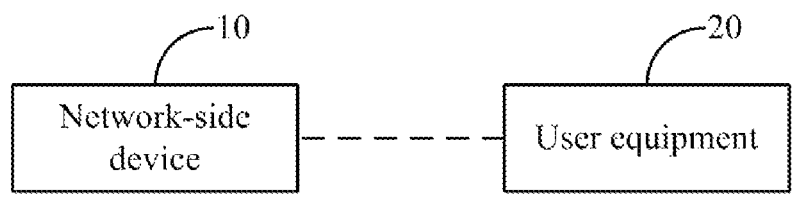
FIG. 4A illustrates a schematic structural diagram of a D2D switching system according to an embodiment of the invention.

As illustrated in FIG. 4A, a D2D switching system according to an embodiment of the invention includes a network-side device 10 and a user equipment 20.

The network-side device 10 is configured to determine from resource management information and/or channel state information whether the D2D user equipment needs to be D2D-switched; and to trigger the D2D user equipment to be switched to a distinct system for device-to-device communication, or to perform device-to-device communication through the network-side device, or to perform device-to-device communication in the present system without being controlled by the network-side device, upon determining that the D2D user equipment needs to be D2D-switched; and The user equipment 20 is configured to be switched to the distinct system for device-to-device communication, or to perform device-to-device communication through the network-side device, or to perform device-to-device communication in the present system without being controlled by the network-side device, upon determining that the network-side device triggers the D2D user equipment to be D2D-switched.

Here the network-side device 10 can determine whether the D2D user equipment needs to be D2D-switched, in a number of approaches, several ones of which will be listed below.

In a first approach, the resource management information includes interference state information and/or load information. The network-side device determines from the resource management information whether the D2D user equipment needs to be D2D-switched, particularly as follows:

The network-side device determines that the D2D user equipment needs to be D2D-switched, upon determining that a D2D switching condition is satisfied.

Here the D2D switching condition includes a part or all of the following conditions:

A first condition, where an interference value or an interference average value to which a user equipment in non-device-to-device communication is really subjected when other user equipments are in device-to-device communication is more than a first threshold;

A second condition, where an interference value or an interference average value to which a user equipment in non-device-to-device communication is expected to be subjected when other user equipments are in device-to-device communication is more than a second threshold, for example, the network-side device determines interference in device-to-device communication over a corresponding resource, from positional or path loss information of the D2D user equipment;

A third condition, where an interference value or an interference average value to which the D2D user equipment is really subjected in device-to-device communication is more than a third threshold;

A forth condition, where an interference value or an interference average value to which the D2D user equipment is expected to be subjected in device-to-device communication is more than a fourth threshold, for example, the network-side device determines interference in device-to-device communication over a corresponding resource, from positional or path loss information of the D2D user equipment;

A fifth condition, where the ratio of a network resource to be occupied by the D2D user equipment needing device-to-device communication to total network resources is more than a fifth threshold;

A sixth condition, where the ratio of a network resource occupied by the D2D user equipment in device-to-device communication to total network resources is more than a sixth threshold;

A seventh condition, where power of a signal, received by the D2D user equipment, transmitted by the network side is lower than an eighth threshold and/or higher than a ninth threshold; and An eighth condition, where switching of the D2D user equipment is allowed to be admitted in the distinct system.

Degree of interference to the user equipment in non-device-to-device communication from the user equipments in device-to-device communication is determined under the first condition.

Expected degree of interference to the user equipment in non-device-to-device communication from the user equipments in device-to-device communication is determined under the second condition, that is, there has been no device-to-device communication yet, but the interference to the user equipment in non-device-to-device communication from device-to-device communication, if any, can be predicated.

The user equipment in non-device-to-device communication may be a D2D user equipment or may be a non-D2D user equipment.

Degree of interference to the D2D user equipment in device-to-device communication is determined under the third condition.

Degree of interference to the D2D user equipment needing device-to-device communication in expected device-to-device communication is determined under the forth condition.

In an implementation, if the D2D user equipment is a user equipment needing device-to-device communication, then the real interference to the D2D user equipment can be total power received over a resource for D2D communication, or a power average value over a unit of resource, in a network configured or predefined time window, i.e., a period of time from a preset time until D2D communication of the D2D user equipment. The preset time here can be preset empirically, through simulation, etc., for example, can be an instance of time when the D2D user equipment requests for D2D communication.

If the D2D user equipment is a user equipment in device-to-device communication, then the real interference to the D2D user equipment is a signal to interference and noise ratio, or a quantified parameter related to the signal to interference and noise ratio, in device-to-device communication of the D2D user equipment.

The parameter can be quantified by determining the quantified parameter corresponding to a range in which the particular value lies, according to a correspondence relationship between the value range and the quantified parameter.

The particular values in the first condition to the sixth condition can be determined and then reported by the user equipment to the network-side device as needed, that is, the interference to the user equipment can be reported by the user equipment to the network-side device; alternatively it can be determined directly by the network-side device.

For example, the parameter values involved in the second condition, the forth condition, the fifth condition, and the sixth condition can be determined directly by the network-side device.

In a second approach, the resource management information includes QoS information. The network-side device can determine from the resource management information whether the D2D user equipment needs to be D2D-switched particularly as follows:

The network-side device determines whether the D2D user equipment needs to be D2D-switched, according to a priority of service of the D2D user equipment, and/or a type of service resource for D2D communication.

For example, if a communication service of the user equipment relates to public security, so a communication quality and a communication delay required of the user equipment need to be guaranteed, then it is determined that the user equipment is not a user equipment capable of being D2D-switched to for D2D communication in contention mechanism, and at this time it is checked whether the device-to-device communication in the present network is in contention mechanism and if not, then no D2D switching will be performed; otherwise, D2D switching will be performed.

For example, if the type of resource for the service of the UE is GBR, then in order to guarantee real-time communication of the user equipment, it is determined that the user equipment is not a user equipment capable of being D2D-switched to D2D communication in contention mechanism, and at this time it is checked whether the device-to-device communication in the present network is in contention mechanism, and if not, then no D2D switching will be performed; otherwise, D2D switching will be performed.

For example, only if a priority level of an Allocation and Reservation Priority (ARP) of the service ranges from 9 to 15, then the user equipment corresponding to the service will be allowed to be D2D-switched in a traditional short-distance scheme, that is, D2D switching will not be performed for a service at a high priority, authorized for reception in an operator domain or for an emergent service, but will only be performed on a service at a low priority. Only if a QoS Category Identifier (QCI) of the service ranges from 5 to 9, then the user corresponding to the service will be allowed to be D2D-switched in the traditional short-distance scheme, that is, D2D switching will not be performed for a GBR bearer service, but will only be performed on a non-GBR service.

It shall be noted that the determination of whether the user equipment is a user equipment capable of being D2D-switched to D2D communication in contention mechanism, and then the making of the D2D switching decision dependent upon the determination have been described only as an example. Any other approaches in which it can be determined from the priority of service and/or the type of service resource whether the D2D user equipment needs to be D2D-switched will be applicable to the embodiment of the invention.

In a third approach, the network-side device can determine from the channel state information whether the D2D user equipment needs to be D2D-switched, particularly as follows:

The network-side device determines from a measured parameter value, measured by the user equipment, of a device-to-device communication channel/signal (i.e., a channel and/or a signal) in the distinct system an operating frequency band of device-to-device direct communication of the user equipment D2D-switched to the distinct system, or receives the operating frequency band of device-to-device communication of the user equipment D2D-switched to the distinct system, reported by the user equipment; and The network-side device determines that the D2D user equipment needs to be D2D-switched, if a channel quality value in the determined operating frequency band is more than a seventh threshold or the sum of the seventh threshold and a floating threshold.

In an implementation, the channel quality value in the operating frequency band can be a channel idling ratio, the ratio of received power of a signal of the user equipment to received power in its available frequency band, or another parameter value capable of representing resource management information in the operating frequency band.

All of the thresholds above can be determined as needed, through simulation, empirically, etc., where the respective thresholds can be specified in a protocol or can be signaled by a higher layer.

Preferably the seventh threshold can be a channel quality value between the user equipments in the LTE cellular network before the user equipment performs the measuring in the distinct system; and the floating threshold is configured to compensate for the rangeability of the resource management information between the user equipments, predicated in the cellular network in the measurement period of time in the distinct system, and can be determined as needed, through simulation, empirically, etc., or can be determined by a higher layer dependent upon a network condition.

I. If the network-side device determines the operating frequency band of the user equipment D2D-switched to the distinct system from the parameter value, measured by the user equipment, of the device-to-device communication channel/signal in the distinct system, then preferably the network-side device can convert the measured parameter value, measured by the user equipment, of the device-to-device communication channel/signal in the distinct system into a parameter value representing the resource management information in the LTE network, and determine the operating frequency band of the user equipment D2D-switched to the distinct system from the converted parameter value; or the user equipment can convert the measured parameter value, measured by the user equipment, of the device-to-device communication channel/signal in the distinct system into the parameter value representing the resource management information in the LTE network, and report the converted parameter value to the network-side device.

The parameter value representing the resource management information in the LTE network can be Reference Signal Received Power (RSRP), a Reference Signal Received Quality (RSRQ) or another parameter value.

The parameter value can be converted particularly by determining the parameter value representing the resource management information in the LTE network, corresponding to the range in which the particular measured parameter value lies according to the correspondence relationship between the range in which the measured parameter value lies, and the parameter value representing the resource management information in the LTE network.

Here the user equipment can report the measured parameter value by firstly quantifying the parameter value, and then transmitting the quantified measured parameter value to the network-side device.

The measured parameter value can be a part or all of the following parameter values:

1. The ratio of received power of a signal of a paired user equipment (i.e., the other D2D user equipment paired with the measuring D2D user equipment for D2D communication) to received power in its available frequency band (transmitting power of the paired user equipment is obtained in advance);

2. Measurement contents of a list of available frequency bands of the user equipment, e.g., received power, received transmitting power of the paired user equipment, etc.

In an implementation, the network-side device can further process the measurement contents of the list of available frequency bands of the user equipment and then make the determination on the measurement contents upon reception thereof, particularly by obtaining the ratio of received power of a signal of the user equipment to received power in its available frequency band (obtaining in advance the transmitting power of the paired user equipment).

Here the device-to-device communication channel/signal in the embodiment of the invention can include but will not be limited to one of the following channels:

Wireless Local Area Network (WLAN) Direct, Bluetooth, and Near Field Communication (NFC).

If the device-to-device communication channel/signal is a WLAN signal, then the measured parameter value can further include a part or all of the following measured parameter values:

A basic measured parameter value, where the measured parameter value here is of a WLAN measurement type and can be a channel related bit flag, e.g., basic service set (BSS):

where if a frame from another network is detected in the measurement period, then this bit will be set; an OFDM preamble: where if a 802.11a short training sequence is detected, but the remaining part of the frame does not accompany, then this bit will be set; an Unidentified Signal: if there is sufficiently high received power, but it is impossible to identify whether the signal comes from another 802.11 network or an OFDM network or is a radar signal, then this bit will be set; Radar: where if a radar signal is detected in the measurement period, then this bit will be set; and Unmeasured: where if the channel is not measured, then this bit will be set;

An idle channel evaluated value, where the idle channel evaluated value here is configured to describe a period of time for which an idle channel evaluation function is set busy;

A Received Power Indicator (RPI) histogram configured to indicate a distribution condition of power received via an interface and to determine a signal strength of another user equipment available from the current network;

A received power indicator of the user equipment;

A received power value, or a received level corresponding to the received power value, in a WLAN available frequency band; and A measured parameter value in the list of available frequency bands.

If the operating frequency band of device-to-device communication of the user equipment D2D-switched to the distinct system, reported by the equipment is received, here the network-side device can determine the operating frequency band of the user equipment D2D-switched to the distinct system from the measured parameter value, measured by the user equipment, of the device-to-device communication channel/signal in the distinct system in a number of ways, for example, by comparing measured parameter values in a plurality of operating frequency band among the available frequency bands, and determining one of the operating frequency bands with the largest parameter value as the operating frequency band; selecting one operating frequency band among the available frequency bands as the operating frequency band; etc.

Preferably in order to improve the accuracy of the measurement, when the user equipment measures the device-to-device communication channel/signal in the distinct system according to a measurement configuration by the network-side device, if the spacing between a measurement frequency band in which the device-to-device communication channel/signal in the distinct system is measured according to the measurement configuration by the network-side device, and a current operating frequency band in the LTE network is no more than a frequency band threshold, then communication over the LTE network will be disabled in a measurement interruption configured by the network-side device; otherwise, the communication over the LTE network will not be disabled.

II. If the network-side device receives the operating frequency band of device-to-device communication of the user equipment D2D-switched to the distinct system, reported by the user equipment, then the user equipment can rank the available frequency bands in an order of their priorities, and report the operating frequency band at the highest priority (i.e., the operating frequency band of the user equipment D2D-switched to the distinct system).

Particularly the user equipment measures the device-to-device communication channel/signal in the distinct system according to the measurement configuration by the network-side device, obtains the measured parameter value, determines the operating frequency band of the user equipment D2D-switched to the distinct system from the measured parameter value, and reports the operating frequency band of the user equipment D2D-switched to the distinct system to the network-side device.

In an implementation, the network-side device can further configure the user equipment to measure the device-to-device communication channel/signal in the distinct system before determining from the resource management information whether the D2D user equipment needs to be D2D-switched.

In order to facilitate management of the user equipments, the D2D user equipments can be grouped. If the network-side device determines that at least one of D2D user equipments in a group of D2D user equipments needs to be D2D-switched, then it will trigger all the D2D user equipments in the group of D2D user equipments to be switched to the distinct system for device-to-device communication, or to perform device-to-device communication through the network-side device, that is, trigger all the D2D user equipments in the group of D2D user equipments to perform switching or trigger all the D2D user equipments in the group of D2D user equipments for device-to-device communication through the network-side device.

Preferably the D2D user equipments are grouped by their geographical positions and/or communication services.

For the user equipments in the group, as long as one of the user equipments makes a measurement report, the other user equipments in the group may not make any measurement report to thereby simplify the system measurement.

Preferably the network-side device sends the same synchronization signal, or broadcasts the synchronization signal, to each of the D2D user equipments in the group of D2D user equipments after triggering the D2D user equipments to be D2D-switched.

Preferably the network-side device can send switching information to the D2D user equipment after triggering the user equipment to be switched to the distinct system for device-to-device communication.

Here the switching information can include a part or all of the following information:

A synchronization signal for synchronization;

Transmitting power information configured to control transmitting power of the D2D user in communication;

Information about a discovery signal (beacon) of the paired user equipment in the distinct system for discovering; and Information about a discovery signal of the user equipment in the distinct system for being discovered.

Preferably if the user equipment is idle, and a length of time for which the resource management information of device-to-device direct communication is less than a signal threshold is more than a preset length of time, then the user equipment is switched from the idle state to the connected state.

Figure 4B:
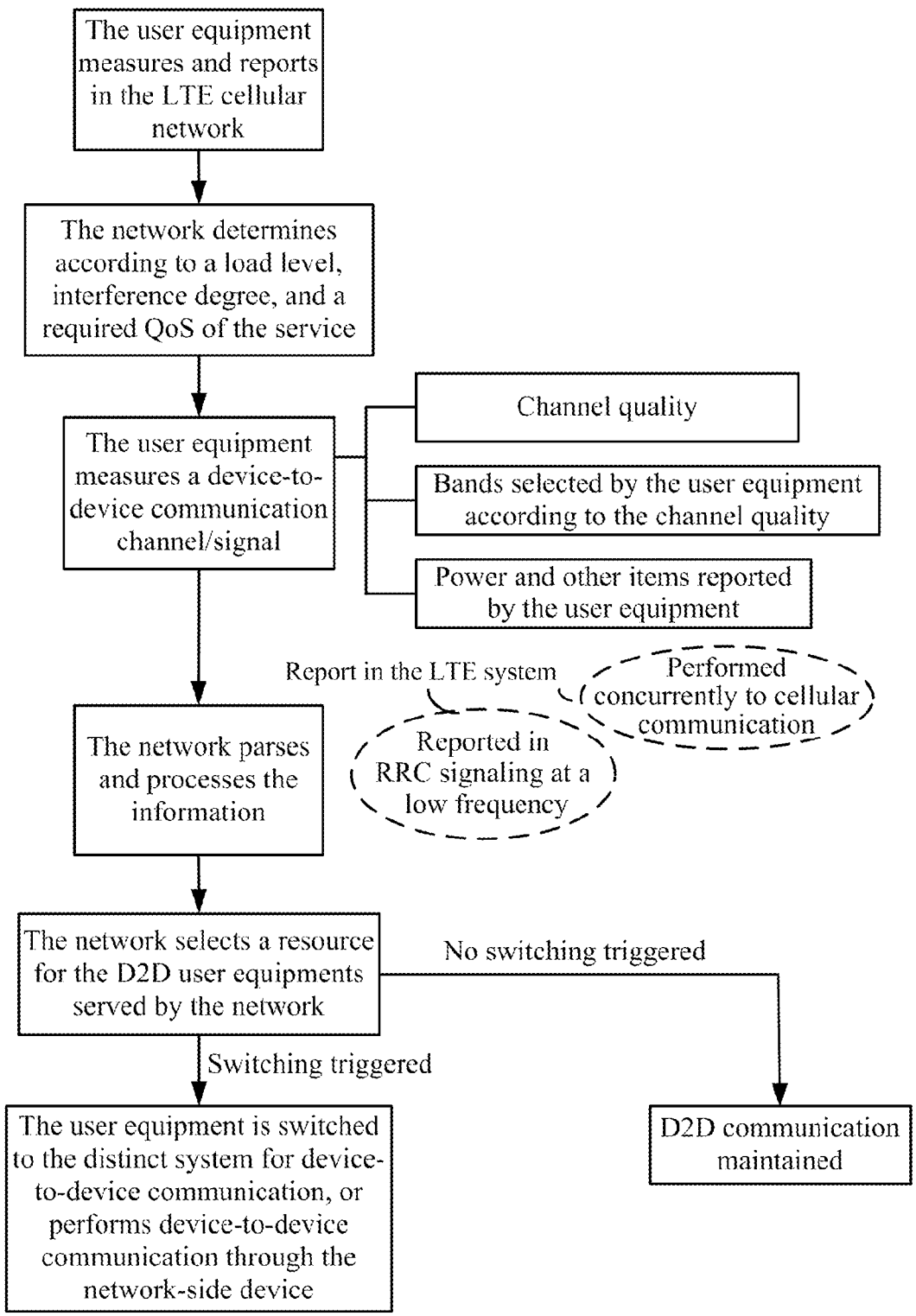
FIG. 4B illustrates a schematic diagram of D2D switching according to an embodiment of the invention.

In an implementation, the first approach to the third approach can be applied together, that is, D2D switching will be triggered only if all of the first approach to the third approach are satisfied, particularly with reference to FIG. 4B where the particular order of the approaches can be preset as needed; or they can be applied separately, that is, D2D switching will be triggered only if the first approach or the second approach or the third approach is satisfied; or they can be applied in combination, that is, D2D switching will be triggered only if the first approach and the second approach, or the first approach and the third approach, or the second approach and the third approach are satisfied.

In an implementation, when the user equipment is in the connected state, if the D2D switching condition is satisfied, then D2D switching will be triggered, and the network-side device will instruct the user equipment to be D2D-switched and notify the user equipment of the particular switching approach (in which the user equipment is switched to the distinct system, or performs device-to-device communication through the network-side device), where the notification can carry necessary information for D2D communication in the traditional D2D network, e.g., in the WLAN system, and the user equipment and the paired user equipment will send Complete messages to the network-side device after the user equipment and the paired user equipment being discovered by each other, so that the switching is completed.

Here the network-side device according to the embodiment of the invention can be an eNB (e.g., a macro eNB, a home eNB, etc.) or a Relay Node (RN) device or another network-side device.

Figure 5A:
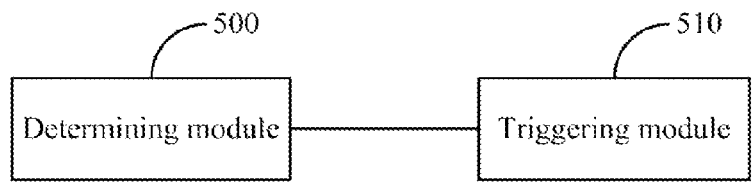
FIG. 5A illustrates a schematic structural diagram of a network-side device in a D2D switching system according to an embodiment of the invention.

As illustrated in FIG. 5A, a network-side device in a D2D switching system according to an embodiment of the invention includes a determining module 500 and a triggering module 510.

The determining module 500 is configured to determine from resource management information and/or channel state information whether a D2D user equipment needs to be D2D-switched; and The triggering module 510 is configured to trigger the D2D user equipment to be switched to a distinct system for device-to-device communication, or to perform device-to-device communication through the network-side device, or to perform device-to-device communication in the present system without being controlled by the network-side device, when it is determined that the D2D user equipment needs to be D2D-switched.

Preferably the triggering module configured to trigger the D2D user equipment to be switched to the distinct system for device-to-device communication is configured:

To trigger the D2D user equipment to be switched to the distinct system for device-to-device communication while being controlled differently by the network-side device or without being controlled by the network-side device; and The triggering module configured to trigger the D2D user equipment for device-to-device communication through the network-side device is configured:

To trigger the D2D user equipment for device-to-device communication in the present system while being controlled differently by the network-side device.

Preferably the determining module 500 is configured to determine that the D2D user equipment needs to be D2D-switched, upon determining that a D2D switching condition is satisfied;

Here the D2D switching condition includes a part or all of the following conditions:

an interference value or an interference average value to which a user equipment in non-device-to-device communication is really subjected when other user equipments are in device-to-device communication is more than a first threshold;

an interference value or an interference average value to which a user equipment in non-device-to-device communication is expected to be subjected when other user equipments are in device-to-device communication is more than a second threshold;

an interference value or an interference average value to which the D2D user equipment is really subjected in device-to-device communication is more than a third threshold;

an interference value or an interference average value to which the D2D user equipment is expected to be subjected in device-to-device communication is more than a fourth threshold;

the ratio of a network resource to be occupied by the D2D user equipment needing device-to-device communication to total network resources is more than a fifth threshold;

the ratio of a network resource occupied by the D2D user equipment in device-to-device communication to total network resources is more than a sixth threshold;

power of a signal, received by the D2D user equipment, transmitted by the network side is lower than an eighth threshold and/or higher than a ninth threshold; and switching of the D2D user equipment is allowed to be admitted in the distinct system.

Preferably if the D2D user equipment is a user equipment needing device-to-device communication, then the interference value to the D2D user equipment is total power received over a resource for D2D communication in a network configured or predefined time window, and the interference average value is a power average value over a unit of resource for D2D communication in the network configured or predefined time window; and If the D2D user equipment is a user equipment in device-to-device communication, then the interference value to the D2D user equipment is a signal to interference and noise ratio in device-to-device communication of the D2D user equipment, and the interference average value is a quantified parameter related to a signal to interference and noise ratio in device-to-device communication of the D2D user equipment.

Preferably the determining module 500 is configured to determine whether the D2D user equipment needs to be D2D-switched, according to a priority of service of the D2D user equipment, and/or a type of service resource for D2D communication.

Preferably the determining module 500 is configured to determine from a measured parameter value, measured by the user equipment, of a device-to-device communication channel/signal in the distinct system an operating frequency band of device-to-device communication of the user equipment D2D-switched to the distinct system, or to receive the operating frequency band of device-to-device communication of the user equipment D2D-switched to the distinct system, reported by the user equipment; and to determine that the D2D user equipment needs to be D2D-switched, if a channel quality value in the determined operating frequency band is more than a seventh threshold or the sum of the seventh threshold and a floating threshold.

Preferably the determining module 500 is configured to configure the user equipment to measure the device-to-device communication channel/signal in the distinct system, before determining from the resource management information whether the D2D user equipment needs to be D2D-switched.

Preferably the determining module 500 is configured to convert the measured parameter value, measured by the user equipment, of the device-to-device communication channel/signal in the distinct system into a parameter value representing the resource management information in an LTE network, and to determine the operating frequency band of the user equipment D2D-switched to the distinct system from the converted parameter value.

Preferably device-to-device direct communication is performed over a WLAN, and the measured parameter value includes a part or all of the following measured parameter values:

A basic measured parameter value;
An idle channel evaluated value;
An RPI histogram;
A received power indicator of the user equipment;
A received power value, or a received level corresponding to the received power value, in a WLAN available frequency band; and
A measured parameter value in a list of available frequency bands.

Preferably the triggering module 510 is configured to determine that at least one of D2D user equipments in a group of D2D user equipments needs to be D2D-switched, and to trigger all the D2D user equipments in the group of D2D user equipments to be D2D-switched, or to perform device-to-device communication through the network-side device, or to perform device-to-device communication in the present system without being controlled by the network-side device.

Preferably the D2D user equipments are grouped by their geographical positions and/or communication services.

Preferably the triggering module 510 is configured to send the same synchronization signal, or to broadcast the synchronization signal, to each of the D2D user equipments in the group of D2D user equipments.

Preferably the triggering module 510 is configured to send switching information to the D2D user equipment after triggering the user equipment to be switched to the distinct system for device-to-device communication;

Here the switching information includes a part or all of the following information:

A synchronization signal for synchronization;
Transmitting power information configured to control transmitting power of the D2D user in communication;
Information about a discovery signal of paired user equipment in the distinct system for discovering; and
Information about a discovery signal of user equipment in the distinct system for being discovered.

Figure 5B:
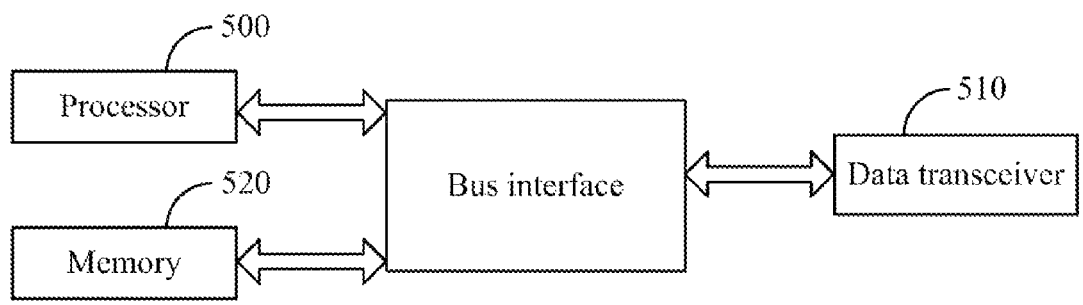
FIG. 5B illustrates a corresponding schematic structural diagram of the network-side device according to the embodiment of the invention in a particular implementation.

As illustrated in FIG. 5B, a D2D switching network-side device according to an embodiment of the invention includes a processor 500 and a data transceiver 510, where:

The processor 500 is configured to determine from resource management information and/or channel state information whether a D2D user equipment needs to be D2D-switched; and to trigger the D2D user equipment to be switched to a distinct system for device-to-device communication, or to perform device-to-device communication through the network-side device, or to perform device-to-device communication in the present system without being controlled by the network-side device, upon determining that the D2D user equipment needs to be D2D-switched; and The data transceiver 510 is configured to transmit data between the processor and the D2D user equipment.

Here in FIG. 5B, the bus architecture can include any number of interconnection buses and bridges which are particularly configured to link various circuits together of one or more processor represented by the processor 500, and a memory represented by a memory 520. The bus architecture can further link various other circuits together, e.g., peripheral devices, a manostat, a power management circuit, etc., all of which are well known in the art, so a repeated description thereof will be omitted here. The bus interface provides an interface. The transceiver 510 can include a plurality of elements including a transmitter and a receiver configured to provide elements communicating with other various apparatuses over a transmission medium. The processor 500 is responsible of managing the bus architecture and of normal processes, and the memory 520 can store data used by the processor 500 in operation.

Figure 6A:
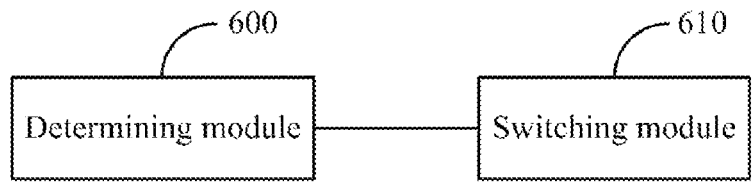
FIG. 6A illustrates a schematic structural diagram of a user equipment in a D2D switching system according to an embodiment of the invention.

As illustrated in FIG. 6A, a user equipment in a D2D switching system according to an embodiment of the invention includes a determining module 600 and a switching module 610.

The determining module 600 is configured to determine that a network-side device triggers the D2D user equipment to be D2D-switched, where the D2D user equipment is triggered by the network-side device to be D2D-switched, upon determining from resource management information and/or channel state information that the D2D user equipment needs to be D2D-switched; and The switching module 610 is configured to switch the user equipment to a distinct system for device-to-device communication, or to perform device-to-device communication through the network-side device, or to perform device-to-device communication in the present system without being controlled by the device-to-device communication.

Preferably the switching module configured to switch the user equipment to the distinct system for device-to-device communication is configured:

To switch the user equipment to the distinct system for device-to-device communication while being controlled differently by the network-side device or without being controlled by the network-side device; and Device-to-device communication through the network-side device includes:

Device-to-device communication in the present system while being controlled differently by the network-side device.

Preferably the determining module 600 is further configured to measure as configured by the network or as predefined, to observe or average a measured quantity in a network configured time window or in a predefined time window, to compare the measured quantity or the averaged measured quantity with a network-configured or predefined threshold, and to report the measured quantity if a condition is satisfied, before determining that the network-side device triggers the D2D user equipment to be D2D-switched.

Preferably the condition includes any one of the following conditions:

an interference value or an interference average value to which a user equipment in non-device-to-device communication is really subjected when other user equipments are in device-to-device communication is more than a first threshold;

an interference value or an interference average value to which a user equipment in non-device-to-device communication is expected to be subjected when other user equipments are in device-to-device communication is more than a second threshold;

an interference value or an interference average value to which the user equipment is really subjected in device-to-device communication is more than a third threshold;

an interference value or an interference average value to which the D2D user equipment is expected to be subjected in device-to-device communication is more than a fourth threshold; and power of a signal, received by the D2D user equipment, transmitted by the network side is lower than an eighth threshold and/or higher than a ninth threshold.

Preferably the determining module 600 is configured to report the received interference value, to the network-side device.

Preferably if the user equipment is a user equipment needing device-to-device communication, then the real interference to the user equipment is total power received over a resource for D2D communication in a network configured or predefined time window from a preset instance of time until D2D communication of the D2D user equipment; and If the user equipment is a user equipment in device-to-device communication, then the interference value to the user equipment is a signal to interference and noise ratio in device-to-device communication of the user equipment.

Preferably the determining module 600 is configured to measure a device-to-device communication channel/signal in the distinct system according to a measurement configuration by the network-side device, to obtain a measured parameter value, and to report the measured parameter value to the network-side device; or to measure the device-to-device communication channel/signal in the distinct system according to the measurement configuration by the network-side device, to obtain the measured parameter value, to quantify the measured parameter value, and to report the quantified measured parameter value to the network-side device; or to measure the device-to-device communication channel/signal in the distinct system according to the measurement configuration by the network-side device, to obtain the measured parameter value, to convert the measured parameter value into a parameter value representing the resource management information in an LTE network, and to report the converted parameter value to the network-side device; or to measure the device-to-device communication channel/signal in the distinct system according to the measurement configuration by the network-side device, to obtain the measured parameter value, to determine from the measured parameter value an operating frequency band of the user equipment D2D-switched to the distinct system, and to report the operating frequency band of the user equipment D2D-switched to the distinct system, to the network-side device.

Preferably device-to-device direct communication is performed over a WLAN, and the measured parameter value includes a part or all of the following measured parameter values:

A basic measured parameter value;
An idle channel evaluated value;
An RPI histogram;
A received power indicator of the user equipment;
A received power value, or a received level corresponding to the received power value, in a WLAN available frequency band; and
A measured parameter value in a list of available frequency bands.

Preferably the determining module 600 is configured to disable communication over the LTE network in a measurement interruption configured by the network-side device if the spacing between a measurement frequency band in which the device-to-device communication channel/signal in the distinct system is measured according to the measurement configuration by the network-side device, and a current operating frequency band in the LTE network is no more than a frequency band threshold.

Preferably the determining module 600 is configured to switch the user equipment from an idle state to a connected state if the user equipment is in the idle state, and a length of time for which the resource management information of device-to-device communication is less than a signal threshold is more than a preset length of time.

Figure 6B:
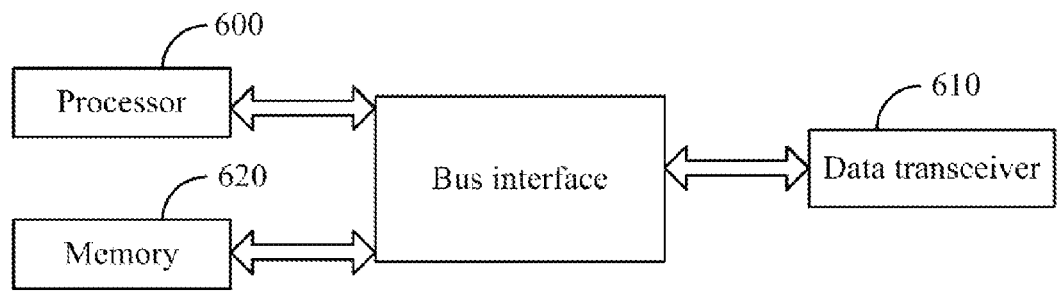
FIG. 6B illustrates a corresponding schematic structural diagram of the user equipment according to the embodiment of the invention in a particular implementation.

As illustrated in FIG. 6B, a D2D switching user equipment according to an embodiment of the invention includes a processor 600 and a data transceiver 610, where:

The processor 600 is configured to determine that a network-side device triggers the D2D user equipment to be D2D-switched, where the D2D user equipment is triggered by the network-side device to be D2D-switched, upon determining from resource management information and/or channel state information that the D2D user equipment needs to be D2D-switched; and to switch the user equipment to a distinct system for device-to-device communication, or to perform device-to-device communication through the network-side device, or to perform device-to-device communication in the present system without being controlled by the device-to-device communication; and The data transceiver 610 is configured to be controlled by the processor 600 to transmit and receive data.

Here in FIG. 6B, the bus architecture can include any number of interconnection buses and bridges which are particularly configured to link various circuits together of one or more processor represented by the processor 600, and a memory represented by a memory 620. The bus architecture can further link various other circuits together, e.g., peripheral devices, a manostat, a power management circuit, etc., all of which are well known in the art, so a repeated description thereof will be omitted here. The bus interface provides an interface. The transceiver 610 can include a plurality of elements including a transmitter and a receiver configured to provide elements communicating with other various apparatuses over a transmission medium. The processor 600 is responsible of managing the bus architecture and of normal processes, and the memory 620 can store data used by the processor 600 in operation.

Based upon the same inventive idea, an embodiment of the invention further provides a method for instructing by a network-side device a user equipment to be D2D-switched, and since the method addresses the problem under a similar principle to the network-side device in the D2D switching system, reference can be made to the implementation of the method for an implementation of the system, although a repeated description thereof will be omitted here.

Figure 7:
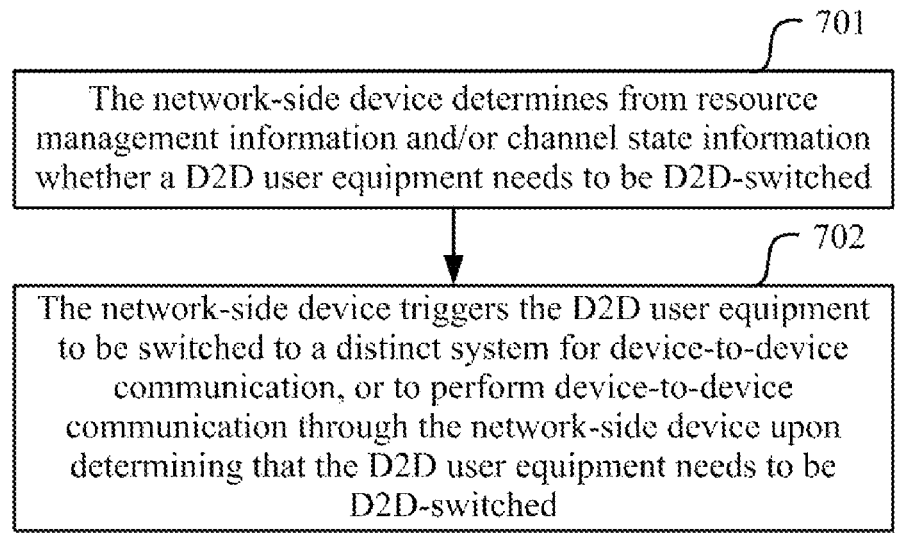
FIG. 7 illustrates a schematic flow chart of a method for instructing by a network-side device a user equipment to perform D2D-switching according to an embodiment of the invention.

As illustrated in FIG. 7, a method for instructing by a network-side device a user equipment to be D2D-switched according to an embodiment of the invention includes:

Operation 701: The network-side device determines from resource management information and/or channel state information whether a D2D user equipment needs to be D2D-switched; and Operation 702: The network-side device triggers the D2D user equipment to be switched to a distinct system for device-to-device communication, or to perform device-to-device communication through the network-side device, or to perform device-to-device communication in the present system without being controlled by the network-side device, upon determining that the D2D user equipment needs to be D2D-switched.

Preferably triggering the D2D user equipment to be switched to the distinct system for device-to-device communication includes:

Triggering the D2D user equipment to be switched to the distinct system for device-to-device communication while being controlled differently by the network-side device or without being controlled by the network-side device; and Triggering the D2D user equipment for device-to-device communication through the network-side device includes:

Triggering the D2D user equipment for device-to-device communication in the present system while being controlled differently by the network-side device.

Here the network-side device 10 can determine whether the D2D user equipment needs to be D2D-switched, in a number of approaches, several ones of which will be listed below.

In a first approach, the network-side device determines that the D2D user equipment needs to be D2D-switched, upon determining a D2D switching condition is satisfied.

Here the D2D switching condition includes a part or all of the following conditions:

A first condition, where an interference value or an interference average value to which a user equipment in non-device-to-device communication is really subjected when other user equipments are in device-to-device communication is more than a first threshold;

A second condition, where an interference value or an interference average value to which a user equipment in non-device-to-device communication is expected to be subjected when other user equipments are in device-to-device communication is more than a second threshold;

A third condition, where an interference value or an interference average value to which the D2D user equipment is really subjected in device-to-device communication is more than a third threshold;

A forth condition, where an interference value or an interference average value to which the D2D user equipment is expected to be subjected in device-to-device communication is more than a fourth threshold;

A fifth condition, where the ratio of a network resource to be occupied by the D2D user equipment needing device-to-device communication to total network resources is more than a fifth threshold;

A sixth condition, where the ratio of a network resource occupied by the D2D user equipment in device-to-device communication to total network resources is more than a sixth threshold;

A seventh condition, where power of a signal, received by the D2D user equipment, transmitted by the network side is lower than an eighth threshold and/or higher than a ninth threshold; and An eighth condition, where switching of the D2D user equipment is allowed to be admitted in the distinct system.

Preferably if the D2D user equipment is a user equipment needing device-to-device communication, then the interference value to the D2D user equipment is total power received over a resource for D2D communication in a network configured or predefined time window, and the interference average value is a power average value over a unit of resource for D2D communication in the network configured or predefined time window; and If the D2D user equipment is a user equipment in device-to-device communication, then the interference value to the D2D user equipment is a signal to interference and noise ratio, or a quantified parameter related to the signal to interference and noise ratio, in device-to-device communication of the D2D user equipment.

In a second approach, the network-side device determines whether the D2D user equipment needs to be D2D-switched, according to a priority of service of the D2D user equipment, and/or a type of service resource for D2D communication.

In a third approach, the network-side device determines from a measured parameter value, measured by the user equipment, of a device-to-device communication channel/signal (i.e., a channel and/or a signal) in the distinct system an operating frequency band of device-to-device communication of the user equipment D2D-switched to the distinct system, or receives the operating frequency band of device-to-device communication of the user equipment D2D-switched to the distinct system, reported by the user equipment; and The network-side device determines that the D2D user equipment needs to be D2D-switched, if a channel quality value in the determined operating frequency band is more than a seventh threshold or the sum of the seventh threshold and a floating threshold.

Preferably before the network-side device determines from the resource management information whether the D2D user equipment needs to be D2D-switched, the method further includes:

The network-side device configures the user equipment to measure the device-to-device communication channel/signal in the distinct system.

Preferably the network-side device converts the measured parameter value, measured by the user equipment, of the device-to-device communication channel/signal in the distinct system into a parameter value representing the resource management information in an LTE network, and determines the operating frequency band of the user equipment D2D-switched to the distinct system from the converted parameter value.

Preferably device-to-device communication is performed over a WLAN, and the measured parameter value includes a part or all of the following measured parameter values:

A basic measured parameter value;

An idle channel evaluated value;

An RPI histogram;

A received power indicator of the user equipment;

A received power value, or a received level corresponding to the received power value, in a WLAN available frequency band; and A measured parameter value in a list of available frequency bands.

Preferably the network-side device determines that at least one of D2D user equipments in a group of D2D user equipments needs to be D2D-switched, and triggers all the D2D user equipments in the group of D2D user equipments to be switched to the distinct system for device-to-device communication, or to perform device-to-device communication through the network-side device, or to perform device-to-device communication in the present system without being controlled by the network-side device.

Preferably the D2D user equipments are grouped by their geographical positions and/or communication services.

Preferably the network-side device sends the same synchronization signal, or to broadcast the synchronization signal, to each of the D2D user equipments in the group of D2D user equipments.

Preferably after the network-side device triggers the user equipment to be switched to the distinct system for device-to-device communication, the method further includes:

The network-side device sends switching information to the user equipment;

Here the switching information includes a part or all of the following information:

A synchronization signal for synchronization;

Transmitting power information configured to control transmitting power of the D2D user equipment in communication;

Information about a discovery signal of paired user equipment in the distinct system for discovering; and Information about a discovery signal of user equipment in the distinct system for being discovered.

Based upon the same inventive idea, an embodiment of the invention further provides a D2D switching method for a user equipment, and since the method addresses the problem under a similar principle to the user equipment in the D2D switching system, reference can be made to the implementation of the method for an implementation of the system, although a repeated description thereof will be omitted here.

Figure 8:
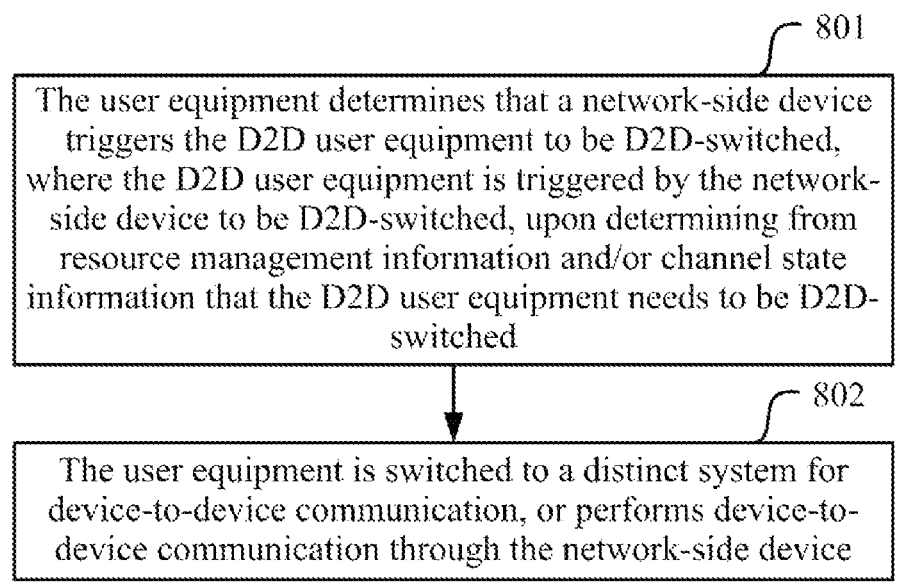
FIG. 8 illustrates a schematic flow chart of a D2D switching method of a user equipment according to an embodiment of the invention.

As illustrated in FIG. 8, a D2D switching method for a user equipment according to an embodiment of the invention includes the following operations:

Operation 801. The user equipment determines that a network-side device triggers the D2D user equipment to be D2D-switched, where the D2D user equipment is triggered by the network-side device to be D2D-switched, upon determining from resource management information and/or channel state information that the D2D user equipment needs to be D2D-switched; and Operation 802. The user equipment is switched to a distinct system for device-to-device communication, or performs device-to-device communication through the network-side device, or performs device-to-device communication in the present system without being controlled by the device-to-device communication.

Preferably switching the user equipment to the distinct system for device-to-device communication includes:

Switching the user equipment to the distinct system for device-to-device communication while being controlled differently by the network-side device or without being controlled by the network-side device; and Device-to-device communication of the user equipment through the network-side device includes:

Device-to-device communication of the user equipment in the present system while being controlled differently by the network-side device.

Preferably before the user equipment determines that the network-side device triggers the D2D user equipment to be D2D-switched, the method further includes:

The user equipment measures as configured by the network or as predefined;

The user equipment observes or averages a measured quantity according to a network configured time window or according to a predefined time window; and The user equipment compares the measured quantity or the averaged measured quantity with a network-configured or predefined threshold, and reports the measured quantity if a condition is satisfied.

Preferably the condition includes any one of the following conditions:

an interference value or an interference average value to which a user equipment in non-device-to-device communication is really subjected when other user equipments are in device-to-device communication is more than a first threshold;

an interference value or an interference average value to which a user equipment in non-device-to-device communication is expected to be subjected when other user equipments are in device-to-device communication is more than a second threshold;

an interference value or an interference average value to which the user equipment is really subjected in device-to-device communication is more than a third threshold;

an interference value or an interference average value to which the D2D user equipment is expected to be subjected in device-to-device communication is more than a fourth threshold; and power of a signal, received by the D2D user equipment, transmitted by the network side is lower than an eighth threshold and/or higher than a ninth threshold.

Preferably before the user equipment determines that the network-side device triggers the D2D user equipment to be D2D-switched, the method further includes:

The user equipment reports the interference value to the user equipment, to the network-side device.

Preferably if the user equipment is a user equipment needing device-to-device communication, then the real interference to the user equipment is total power received over a resource for D2D communication from a preset instance of time until D2D communication of the D2D user equipment; and If the user equipment is a user equipment in device-to-device communication, then the interference value to the user equipment is a signal to interference and noise ratio in device-to-device communication of the user equipment.

Preferably before the user equipment determines that the network-side device triggers the D2D user equipment to be D2D-switched, the method further includes:

The user equipment measures a device-to-device communication channel/signal in the distinct system according to a measurement configuration by the network-side device, obtains a measured parameter value, and reports the measured parameter value to the network-side device; or The user equipment measures the device-to-device communication channel/signal in the distinct system according to the measurement configuration by the network-side device, obtains the measured parameter values, quantifies the measured parameter value, and reports the quantified measured parameter value to the network-side device; or The user equipment measures the device-to-device communication channel/signal in the distinct system according to the measurement configuration by the network-side device, obtains the measured parameter value, converts the measured parameter value into a parameter value representing the resource management information in an LTE network, and reports the converted parameter value to the network-side device; or The user equipment measures the device-to-device communication channel/signal in the distinct system according to the measurement configuration by the network-side device, obtains the measured parameter value, determines from the measured parameter value an operating frequency band of the user equipment D2D-switched to the distinct system, and reports the operating frequency band of the user equipment D2D-switched to the distinct system, to the network-side device.

Preferably device-to-device communication is performed over a WLAN, and the measured parameter value includes a part or all of the following measured parameter values:

A basic measured parameter value;

An idle channel evaluated value;

An RPI histogram;

A received power indicator of the user equipment;

A received power value, or a received level corresponding to the received power value, in a WLAN available frequency band; and A measured parameter value in a list of available frequency bands.

Preferably before the user equipment measures the device-to-device communication channel/signal in the distinct system according to the measurement configuration by the network-side device, the method further includes:

The user equipment disables communication over the LTE network in a measurement interruption configured by the network-side device if the spacing between a measurement frequency band in which the device-to-device communication channel/signal in the distinct system is measured according to the measurement configuration by the network-side device, and a current operating frequency band in the LTE network is no more than a frequency band threshold.

Preferably before the user equipment determines that the network-side device triggers the D2D user equipment to be D2D-switched, the method further includes:

The user equipment is switched from an idle state to a connected state if the user equipment is in the idle state, and a length of time for which the resource management information of device-to-device communication is less than a signal threshold is more than a preset length of time.

Figure 9:
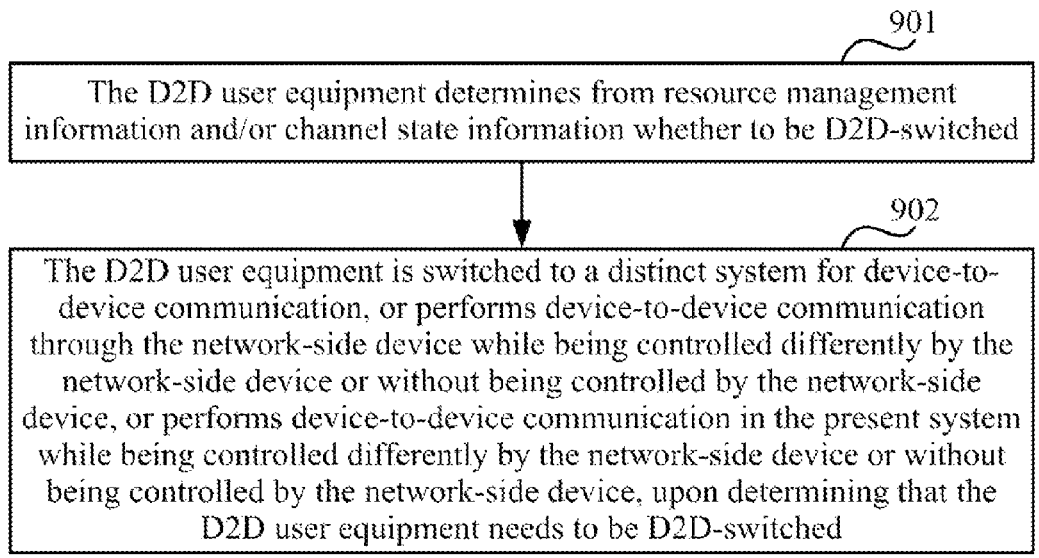
FIG. 9 illustrates a flow chart of another D2D switching method according to an embodiment of the invention.

An embodiment of the invention further provides a D2D switching method in which a D2D device decides itself whether to be D2D-switched, as illustrated in FIG. 9, where the method includes:

Operation 901. The D2D user equipment determines from resource management information and/or channel state information whether to be D2D-switched; and Operation 902. The D2D user equipment is switched to a distinct system for device-to-device communication, or performs device-to-device communication through the network-side device while being controlled differently by the network-side device or without being controlled by the network-side device, or performs device-to-device communication in the present system while being controlled differently by the network-side device or without being controlled by the network-side device, upon determining that the D2D user equipment needs to be D2D-switched.

Preferably the D2D user equipment determining from the resource management information whether to be D2D-switched includes:

Preferably it is determined that the D2D user equipment needs to be D2D-switched, upon determining that a D2D switching condition is satisfied, or it is determined whether to be D2D-switched, according to a priority of service of the D2D user equipment, and/or a type of service resource for D2D communication;

Here the D2D switching condition includes a part or all of the following conditions:

An interference value or an interference average value to which the D2D user equipment, which is a D2D user equipment needing device-to-device communication, is really subjected when other user equipments are in device-to-device communication is more than a first threshold;

An interference value or an interference average value to which the D2D user equipment, which is a D2D user equipment needing device-to-device communication, is expected to be subjected when other user equipments are in device-to-device communication is more than a second threshold;

An interference value or an interference average value to which the D2D user equipment, which is a D2D user equipment in device-to-device communication, is really subjected in device-to-device communication is more than a third threshold;

An interference value or an interference average value to which the D2D user equipment, which is a D2D user equipment needing device-to-device communication, is expected to be subjected in device-to-device communication is more than a fourth threshold;

The ratio of a network resource to be occupied by the D2D user equipment, which is a D2D user equipment needing device-to-device communication, to total network resources is more than a fifth threshold;

The ratio of a network resource occupied by the D2D user equipment, which is a D2D user equipment in device-to-device communication, to total network resources is more than a sixth threshold; and Power of a signal, received by the D2D user equipment, transmitted by the network side is lower than an eighth threshold and/or higher than a ninth threshold.

Preferably if the D2D user equipment is a user equipment needing device-to-device communication, then the interference value to the D2D user equipment is total power received over a resource for D2D communication in a network configured or predefined time window, and the interference average value is a power average value over a unit of resource for D2D communication in the network configured or predefined time window; and If the D2D user equipment is a user equipment in device-to-device communication, then the interference value to the D2D user equipment is a signal to interference and noise ratio in device-to-device communication of the D2D user equipment, and the interference average value is a quantified parameter related to a signal to interference and noise ratio in device-to-device communication of the D2D user equipment.

Preferably the D2D user equipment determining from the channel state information whether to be D2D-switched includes:

Determining an operating frequency band of device-to-device communication of the user equipment switched to the distinct system, from a measured parameter value measured of a device-to-device communication channel/signal in the distinct system according to a measurement configuration by the network-side device; and Determining that the D2D user equipment needs to be D2D-switched, if a channel quality value in the determined operating frequency band is more than a seventh threshold or the sum of the seventh threshold and a floating threshold.

Preferably determining the operating frequency band of the user equipment switched to the distinct system, from the measured parameter value of the device-to-device communication channel/signal in the distinct system includes:

Converting the measured parameter value measured of the device-to-device communication channel/signal in the distinct system into a parameter value representing the resource management information in a Long Term Evolution (LTE) network, and determining the operating frequency band in the distinct system from the converted parameter value.

Preferably device-to-device communication is performed over a WLAN, and the measured parameter value includes a part or all of the following measured parameter values:

A basic measured parameter value;

An idle channel evaluated value;

A Received power Indicator (RPI) histogram;

A received power indicator of the user equipment;

A received power value, or a received level corresponding to the received power value, in a Wireless Local Area Network (WLAN) available frequency band; and A measured parameter value in a list of available frequency bands.

Preferably before the device-to-device communication channel/signal in the distinct system is measured according to the measurement configuration by the network-side device, the method further includes:

Disabling communication over the LTE network in a measurement interruption configured by the network-side device if the spacing between a measurement frequency band in which the device-to-device communication channel/signal in the distinct system is measured according to the measurement configuration by the network-side device, and a current operating frequency band in the LTE network is no more than a frequency band threshold.

Preferably before it is determined that the D2D user equipment needs to be D2D-switched, the method further includes:

Switching the D2D user equipment from an idle state to a connected state if the D2D user equipment is in the idle state, and a length of time for which the resource management information of device-to-device communication is less than a signal threshold is more than a preset length of time.

Figure 10A:
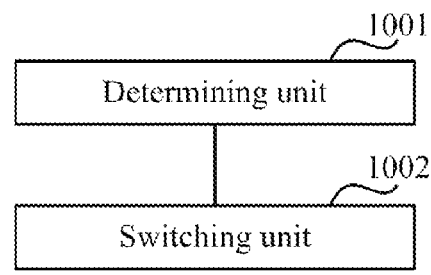
FIG. 10A illustrates a schematic diagram of another D2D user equipment according to an embodiment of the invention.

Based upon the same inventive idea, there is further provided a user equipment for D2D switching as illustrated in FIG. 10A including:

A determining unit 1001 is configured to determine from resource management information and/or channel state information whether the user equipment needs to be D2D-switched; and A switching unit 1002 is configured to switch the user equipment to a distinct system for device-to-device communication while being controlled differently by a network-side device or without being controlled by the network-side device, or to perform device-to-device communication in the present system while being controlled differently by the network-side device or without being controlled by the network-side device, when it is determined that the user equipment needs to be D2D-switched.

Preferably the determining unit configured to determine from the resource management information whether the user equipment needs to be D2D-switched is configured:

To determine that the user equipment needs to be D2D-switched, upon determining that a D2D switching condition is satisfied, or to determine whether the user equipment needs to be D2D-switched, according to a priority of service of the user equipment, and/or a type of service resource for D2D communication;

Here the D2D switching condition includes a part or all of the following conditions:

An interference value or an interference average value to which the user equipment, which is a user equipment needing device-to-device communication, is really subjected when other user equipments are in device-to-device communication is more than a first threshold;

An interference value or an interference average value to which the user equipment, which is a user equipment needing device-to-device communication, is expected to be subjected when other user equipments are in device-to-device communication is more than a second threshold;

An interference value or an interference average value to which the user equipment, which is a user equipment in device-to-device communication, is really subjected in device-to-device communication is more than a third threshold;

An interference value or an interference average value to which the user equipment, which is a user equipment needing device-to-device communication, is expected to be subjected in device-to-device communication is more than a fourth threshold;

The ratio of a network resource to be occupied by the user equipment, which is a user equipment needing device-to-device communication, to total network resources is more than a fifth threshold;

The ratio of a network resource occupied by the user equipment, which is a user equipment in device-to-device communication, to total network resources is more than a sixth threshold; and Power of a signal, received by the user equipment, transmitted by the network side is lower than an eighth threshold and/or higher than a ninth threshold.

Preferably if the user equipment is a user equipment needing device-to-device communication, then the real interference to the user equipment is total power received over a resource for D2D communication in a network configured or predefined time window, and the interference average value is a power average value over a unit of resource for D2D communication in the network configured or predefined time window; and If the user equipment is a user equipment in device-to-device communication, then the interference value to the user equipment is a signal to interference and noise ratio in device-to-device communication of the user equipment, and the interference average value is a quantified parameter related to a signal to interference and noise ratio in device-to-device communication of the user equipment.

Preferably the determining unit configured to determine from the channel state information whether the user equipment needs to be D2D-switched is configured:

To determine an operating frequency band of device-to-device direct communication of the user equipment switched to the distinct system, from a measured parameter value measured of a device-to-device communication channel/signal in the distinct system according to a measurement configuration by the network-side device; and To determine that the user equipment needs to be D2D-switched, if a channel quality value in the determined operating frequency band is more than a seventh threshold or the sum of the seventh threshold and a floating threshold.

Preferably the determining unit configured to determine the operating frequency band of device-to-device communication of the user equipment switched to the distinct system, from the measured parameter value of the device-to-device communication channel/signal in the distinct system is configured:

To convert the measured parameter value measured of the device-to-device communication channel/signal in the distinct system into a parameter value representing the resource management information in a Long Term Evolution (LTE) network, and to determine the operating frequency band in the distinct system from the converted parameter value.

Preferably device-to-device communication is performed over a WLAN, and the measured parameter value includes a part or all of the following measured parameter values:

A basic measured parameter value;

An idle channel evaluated value;

A Received power Indicator (RPI) histogram;

A received power indicator of the user equipment;

A received power value, or a received level corresponding to the received power value, in a Wireless Local Area Network (WLAN) available frequency band; and A measured parameter value in a list of available frequency bands.

Preferably before the device-to-device communication channel/signal in the distinct system is measured according to the measurement configuration by the network-side device, the determining unit is further configured to disable communication over the LTE network in a measurement interruption configured by the network-side device if the spacing between a measurement frequency band in which the device-to-device communication channel/signal in the distinct system is measured according to the measurement configuration by the network-side device, and a current operating frequency band in the LTE network is no more than a frequency band threshold.

Preferably before it is determined that the D2D user equipment needs to be D2D-switched, the determining unit is further configured to switch the D2D user equipment from an idle state to a connected state if the D2D user equipment is in the idle state, and a length of time for which the resource management information of device-to-device communication is less than a signal threshold is more than a preset length of time.

Figure 10B:
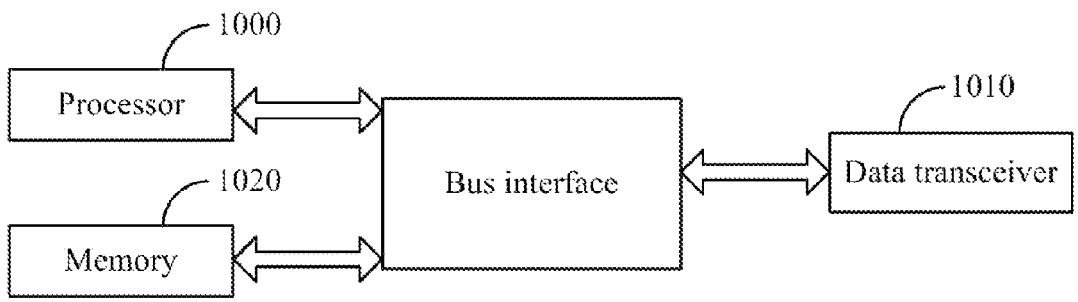
FIG. 10B illustrates a corresponding schematic structural diagram of the D2D user equipment according to the embodiment of the invention in a particular implementation.

An embodiment of the invention further provides a user equipment for D2D switching as illustrated in FIG. 10B including a processor 1000 and a data transceiver 1001, where:

The processor 1000 is configured to determine from resource management information and/or channel state information whether the user equipment needs to be D2D-switched; and to switch the user equipment to a distinct system for device-to-device communication while being controlled differently by a network-side device or without being controlled by the network-side device, or to perform device-to-device communication in the present system while being controlled differently by the network-side device or without being controlled by the network-side device, upon determining that the user equipment needs to be D2D-switched; and The data transceiver 1001 is configured to be controlled by the processor 1000 to transmit and receive data.

Here in FIG. 10B, the bus architecture can include any number of interconnection buses and bridges which are particularly configured to link various circuits together of one or more processor represented by the processor 1000, and a memory represented by a memory 1020. The bus architecture can further link various other circuits together, e.g., peripheral devices, a manostat, a power management circuit, etc., all of which are well known in the art, so a repeated description thereof will be omitted here. The bus interface provides an interface. The transceiver 1010 can include a plurality of elements including a transmitter and a receiver configured to provide elements communicating with other various apparatuses over a transmission medium. The processor 1000 is responsible of managing the bus architecture and of normal processes, and the memory 1020 can store data used by the processor 1000 in operation.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A Device-to-Device, D2D, switching method, comprising:
   determining, by a network-side device according to one or combination of resource management information and channel state information, whether a D2D user equipment needs to be D2D-switched; and
   triggering, by the network-side device, the D2D user equipment to be switched to a different system for device-to-device communication, or to perform device-to-device communication through the network-side device, or to perform device-to-device communication in a present system without being controlled by the network-side device, upon determining that the D2D user equipment needs to be D2D-switched;
   wherein determining, by the network-side device from the resource management information, whether the D2D user equipment needs to be D2D-switched comprises:
   determining, by the network-side device, the D2D user equipment needs to be D2D-switched, upon determining that a D2D switching condition is satisfied, or determining, by the network-side device, whether the D2D user equipment needs to be D2D-switched according to one or combination of a priority of service of the D2D user equipment and a type of service resource for D2D communication;

wherein the D2D switching condition comprises one or a combination of following conditions:

an interference value or an interference average value to which a user equipment in non-device-to-device communication is actually subjected when other user equipments are in device-to-device communication is more than a first threshold;

an interference value or an interference average value to which a user equipment in non-device-to-device communication is estimated to be subjected when other user equipments are in device-to-device communication is more than a second threshold;

an interference value or an interference average value to which the D2D user equipment is actually subjected in device-to-device communication is more than a third threshold;

an interference value or an interference average value to which the D2D user equipment is estimated to be subjected in device-to-device communication is more than a fourth threshold;

the ratio of a network resource to be occupied by the D2D user equipment needing device-to-device communication to total network resources is more than a fifth threshold;

the ratio of a network resource occupied by the D2D user equipment in device-to-device communication to total network resources is more than a sixth threshold;

power of a signal, received by the D2D user equipment, transmitted by the network side is lower than an eighth threshold, or higher than a ninth threshold, or lower than the eighth threshold and higher than the ninth threshold; and switching of the D2D user equipment is allowed to be admitted in the different system;

wherein if the D2D user equipment needs to be in device-to-device communication, then the interference value to the D2D user equipment is total power received over a resource for D2D communication in a network configured or predefined time window, and the interference average value is a power average value over a unit of resource for D2D communication in the network configured or predefined time window; and if the D2D user equipment is in device-to-device communication, then the interference value to the D2D user equipment is a signal to interference and noise ratio in device-to-device communication of the D2D user equipment, and the interference average value is a quantified parameter related to a signal to interference and noise ratio in device-to-device communication of the D2D user equipment.

2. The method according to claim 1, wherein:

triggering the D2D user equipment to be switched to the different system for device-to-device communication comprises:

triggering the D2D user equipment to be switched to the different system for device-to-device communication while being controlled in different levels by the network-side device or without being controlled by the network-side device; and triggering the D2D user equipment to perform device-to-device communication through the network-side device comprises:

triggering the D2D user equipment to perform device-to-device communication in the present system while being controlled in different levels by the network-side device.

3. The method according to claim 1, wherein determining, by the network-side device from the channel state information, whether the D2D user equipment needs to be D2D-switched comprises:

determining, by the network-side device from a measured parameter value, measured by the D2D user equipment, of one or combination of a device-to-device communication channel and signal in the different system an operating frequency band of device-to-device communication of the user equipment D2D-switched to the different system, or receiving the operating frequency band of device-to-device communication of the D2D user equipment D2D-switched to the different system, reported by the user equipment; and determining, by the network-side device, that the D2D user equipment needs to be D2D-switched, if a channel quality value in the determined operating frequency band is more than a seventh threshold or the sum of the seventh threshold and a floating threshold, wherein the floating threshold is configured to compensate for rangeability of the resource management information between user equipments, predicated in a cellular network in a measurement period of time in the system different from the present system.

4. The method according to claim 3, wherein before determining, by the network-side device from the channel state information, whether the D2D user equipment needs to be D2D-switched, the method further comprises:

configuring, by the network-side device, the D2D user equipment to measure one or combination of the device-to-device communication channel and signal in the different system.

5. The method according to claim 3, wherein determining, by the network-side device from the measured parameter value, measured by the D2D user equipment, of one or combination of the device-to-device communication channel and signal in the different system the operating frequency band of the user equipment D2D-switched to the different system comprises:

converting, by the network-side device, the measured parameter value, measured by the D2D user equipment, of one or combination of the device-to-device communication channel and signal in the different system into a parameter value corresponding to a resource management information in a Long Term Evolution, LTE, network, and determining the operating frequency band of the D2D user equipment D2D-switched to the different system from the converted parameter value.

6. The method according to claim 3, wherein device-to-device direct communication is performed over a Wireless Local Area Network, WLAN, and the measured parameter value comprises one or combination of following measured parameter values:

a WLAN measurement type;
an idle channel evaluated value;
a Received Power Indicator, RPI, histogram;
a received power indicator of the user equipment;
a received power value, or a received level corresponding to the received power value, in a WLAN available frequency band; and a measured parameter value in a list of available frequency bands.

7. The method according to claim 1, wherein triggering, by the network-side device, the D2D user equipment to be switched to the different system for device-to-device communication, or to perform device-to-device communication through the network-side device, or to perform device-to-device communication in the present system without being controlled by the network-side device, upon determining that the D2D user equipment needs to be D2D-switched, comprises:
determining, by the network-side device, that at least one of D2D user equipments in a group of D2D user equipments needs to be D2D-switched, and triggering all the D2D user equipments in the group of D2D user equipments to be switched to the different system for device-to-device communication, or to perform device-to-device communication through the network-side device, or to perform device-to-device communication in the present system without being controlled by the network-side device.

8. The method according to claim 7, wherein the D2D user equipments are grouped according to one or combination of their geographical positions and communication services.

9. A Device-to-Device, D2D, switching method, comprising:
determining, by a D2D user equipment according to one or combination of resource management information and channel state information, whether to be D2D-switched; and
switching to a different system for device-to-device communication, or performing device-to-device communication through the network-side device while being controlled in different levels by the network-side device or without being controlled by the network-side device, or performing device-to-device communication in a present system while being controlled in different levels by the network-side device or without being controlled by the network-side device, upon determining that the D2D user equipment needs to be D2D-switched;
wherein determining, by the D2D user equipment from the resource management information, whether to be D2D-switched comprises:
determining that the D2D user equipment needs to be D2D-switched, upon determining that a D2D switching condition is satisfied, or determining whether to be D2D-switched, according to one or combination of a priority of service of the D2D user equipment and a type of service resource for D2D communication;
wherein the D2D switching condition comprises one or combination of following conditions:
an interference value or an interference average value to which the D2D user equipment needing to be in device-to-device communication, is actually subjected when other user equipments are in device-to-device communication is more than a first threshold;
an interference value or an interference average value to which the D2D user equipment needing to be in device-to-device communication, is estimated to be subjected when other user equipments are in device-to-device communication is more than a second threshold;
an interference value or an interference average value to which the D2D user equipment being in device-to-device communication, is actually subjected in device-to-device communication is more than a third threshold;
an interference value or an interference average value to which the D2D user equipment needing to be in device-to-device communication, is estimated to be subjected in device-to-device communication is more than a fourth threshold;
the ratio of a network resource to be occupied by the D2D user equipment needing to be in device-to-device communication, to total network resources is more than a fifth threshold;
the ratio of a network resource occupied by the D2D user equipment being in device-to-device communication, to total network resources is more than a sixth threshold; and
power of a signal, received by the D2D user equipment, transmitted by the network side is lower than an eighth threshold, or higher than a ninth threshold, or lower than the eighth threshold and higher than the ninth threshold;
wherein if the D2D user equipment needs to be in device-to-device communication, then the interference value to the D2D user equipment is total power received over a resource for D2D communication in a network configured or predefined time window, and the interference average value is a power average value over a unit of resource for D2D communication in the network configured or predefined time window; and
if the D2D user equipment is in device-to-device communication, then the interference value to the D2D user equipment is a signal to interference and noise ratio in device-to-device communication of the D2D user equipment, and the interference average value is a quantified parameter related to a signal to interference and noise ratio in device-to-device communication of the D2D user equipment.

10. The method according to claim 9, wherein determining, by the D2D user equipment from the channel state information, whether to be D2D-switched comprises:
determining an operating frequency band of device-to-device communication of the user equipment switched to the different system, from a measured parameter value measured of one or combination of a device-to-device communication channel and signal in the different system according to a measurement configuration by the network-side device; and
determining that the D2D user equipment needs to be D2D-switched, if a channel quality value in the determined operating frequency band is more than a seventh threshold or the sum of the seventh threshold and a floating threshold, wherein the floating threshold is configured to compensate for rangeability of the resource management information between user equipments, predicated in a cellular network in a measurement period of time in the system different from the present system.

11. The method according to claim 10, wherein determining the operating frequency band of the user equipment switched to the different system, from the measured parameter value of one or combination of the device-to-device communication channel and signal in the different system comprises:
converting the measured parameter value measured of one or combination of the device-to-device communication channel and signal in the different system into a parameter value corresponding to resource management information in a Long Term Evolution, LTE, network, and determining the operating frequency band in the different system from the converted parameter value.

12. The method according to claim 10, wherein device-to-device direct communication is performed over a Wireless Local Area Network, WLAN, and the measured parameter value comprises one or combination of following measured parameter values:
   a WLAN measurement type;
   an idle channel evaluated value;
   a Received power Indicator, RPI, histogram;
   a received power indicator of the user equipment;
   a received power value, or a received level corresponding to the received power value, in a WLAN available frequency band; and
   a measured parameter value in a list of available frequency bands.

13. The method according to claim 10, wherein before measuring one or combination of the device-to-device communication channel and signal in the different system according to the measurement configuration by the network-side device, the method further comprises:
   disabling communication over the LTE network in a measurement interruption configured by the network-side device if a spacing between a measurement frequency band in which one or combination of the device-to-device communication channel and signal in the different system is measured according to the measurement configuration by the network-side device, and a current operating frequency band in the LTE network is no more than a frequency band threshold.

14. The method according to claim 9, wherein before determining that the D2D user equipment needs to be D2D-swtiched, the method further comprises:
   Switching, by the D2D user equipment, from an idle state to a connected state if the D2D user equipment is in the idle state, and a length of time for which resource management information of device-to-device communication is less than a signal threshold is more than a preset length of time.

15. A Device-to-Device, D2D, switching network-side device, comprising:
   a determining module configured to determine according to one or combination of resource management information and channel state information whether a D2D user equipment needs to be D2D-switched; and
   a triggering module configured to trigger the D2D user equipment to be switched to a different system for device-to-device communication, or to perform device-to-device communication through the network-side device, or to perform device-to-device communication in a present system without being controlled by the network-side device, when it is determined that the D2D user equipment needs to be D2D-switched;
   wherein the determining module is configured:
   to determine that the D2D user equipment needs to be D2D-switched, upon determining that a D2D switching condition is satisfied, or to determine whether the D2D user equipment needs to be D2D-switched according to one or combination of a priority of service of the D2D user equipment and a type of service resource for D2D communication;
   wherein the D2D switching condition comprises one or a combination of following conditions:
   an interference value or an interference average value to which a user equipment in non-device-to-device communication is actually subjected when other user equipments are in device-to-device communication is more than a first threshold;
   an interference value or an interference average value to which a user equipment in non-device-to-device communication is estimated to be subjected when other user equipments are in device-to-device communication is more than a second threshold;
   an interference value or an interference average value to which the D2D user equipment is actually subjected in device-to-device communication is more than a third threshold;
   an interference value or an interference average value to which the D2D user equipment is estimated to be subjected in device-to-device communication is more than a fourth threshold;
   the ratio of a network resource to be occupied by the D2D user equipment needing device-to-device communication to total network resources is more than a fifth threshold;
   the ratio of a network resource occupied by the D2D user equipment in device-to-device communication to total network resources is more than a sixth threshold;
   power of a signal, received by the D2D user equipment, transmitted by the network side is lower than an eighth threshold, or higher than a ninth threshold, or lower than the eighth threshold and higher than the ninth threshold; and
   switching of the D2D user equipment is allowed to be admitted in the different system;
   wherein if the D2D user equipment needs to be in device-to-device communication, then the interference value to the D2D user equipment is total power received over a resource for D2D communication in a network configured or predefined time window, and the interference average value is a power average value over a unit of resource for D2D communication in the network configured or predefined time window; and
   if the D2D user equipment is in device-to-device communication, then the interference value to the D2D user equipment is a signal to interference and noise ratio in device-to-device communication of the D2D user equipment, and the interference average value is a quantified parameter related to a signal to interference and noise ratio in device-to-device communication of the D2D user equipment.

16. A Device-to-Device, D2D, switching user equipment, comprising:
   a determining module configured to determine according to one or combination of resource management information and channel state information whether the user equipment needs to be D2D-switched; and
   a switching module configured to switch to a different system for device-to-device communication while being controlled in different levels by a network-side device or without being controlled by the network-side device, or to perform device-to-device communication in a present system while being controlled in different levels by the network-side device or without being controlled by the network-side device, when it is determined that the user equipment needs to be D2D-switched;
   wherein the determining module configured to determine from the resource management information whether the user equipment needs to be D2D-switched is configured:

to determine that the D2D user equipment needs to be D2D-switched, upon determining that a D2D switching condition is satisfied, or to determine whether to be D2D-switched, according to one or combination of a priority of service of the D2D user equipment and a type of service resource for D2D communication;

wherein the D2D switching condition comprises one or combination of following conditions:

an interference value or an interference average value to which the D2D user equipment needing to be in device-to-device communication, is actually subjected when other user equipments are in device-to-device communication is more than a first threshold;

an interference value or an interference average value to which the D2D user equipment needing to be in device-to-device communication, is estimated to be subjected when other user equipments are in device-to-device communication is more than a second threshold;

an interference value or an interference average value to which the D2D user equipment being in device-to-device communication, is actually subjected in device-to-device communication is more than a third threshold;

an interference value or an interference average value to which the D2D user equipment needing to be in device-to-device communication, is estimated to be subjected in device-to-device communication is more than a fourth threshold;

the ratio of a network resource to be occupied by the D2D user equipment needing to be in device-to-device communication, to total network resources is more than a fifth threshold;

the ratio of a network resource occupied by the D2D user equipment being in device-to-device communication, to total network resources is more than a sixth threshold; and power of a signal, received by the D2D user equipment, transmitted by the network side is lower than an eighth threshold, or higher than a ninth threshold, or lower than the eighth threshold and higher than the ninth threshold;

wherein if the D2D user equipment needs to be in device-to-device communication, then the interference value to the D2D user equipment is total power received over a resource for D2D communication in a network configured or predefined time window, and the interference average value is a power average value over a unit of resource for D2D communication in the network configured or predefined time window; and if the D2D user equipment is in device-to-device communication, then the interference value to the D2D user equipment is a signal to interference and noise ratio in device-to-device communication of the D2D user equipment, and the interference average value is a quantified parameter related to a signal to interference and noise ratio in device-to-device communication of the D2D user equipment.

* * * * *